United States Patent [19]
Arnold et al.

[11] Patent Number: 5,440,723
[45] Date of Patent: Aug. 8, 1995

[54] AUTOMATIC IMMUNE SYSTEM FOR COMPUTERS AND COMPUTER NETWORKS

[75] Inventors: William C. Arnold, Mahopac; David M. Chess, Mohegan Lake; Jeffrey O. Kephart, Yorktown Heights; Steven R. White, New York, all of N.Y.

[73] Assignee: International Business Machines Corporation, Armonk, N.Y.

[21] Appl. No.: 4,872

[22] Filed: Jan. 19, 1993

[51] Int. Cl.$^6$ ............................................. G06F 11/00
[52] U.S. Cl. .................................... 395/181; 395/700; 395/183.09; 395/183.14
[58] Field of Search ................ 395/575; 371/16.5, 19, 371/11.2, 8.2

[56] References Cited

U.S. PATENT DOCUMENTS

| | | | |
|---|---|---|---|
| 5,062,045 | 10/1991 | Janis et al. | 371/16.5 |
| 5,084,816 | 1/1992 | Boese et al. | 395/575 |
| 5,121,345 | 1/1992 | Lentz | 364/550 |
| 5,200,958 | 4/1993 | Hamilton et al. | 371/16.5 |
| 5,218,605 | 1/1993 | Low et al. | 371/19 |
| 5,255,208 | 10/1993 | Thakore et al. | 371/16.5 |
| 5,278,901 | 1/1994 | Shieh et al. | 380/4 |
| 5,291,590 | 3/1994 | Ohnishi et al. | 371/16.5 |
| 5,297,150 | 3/1994 | Clark | 371/19 |
| 5,319,776 | 6/1994 | Hile et al. | 395/575 |
| 5,359,659 | 10/1994 | Rosenthal | 380/4 |
| 5,361,359 | 11/1994 | Tajallie et al. | 395/700 |

OTHER PUBLICATIONS

Qasem et al. "AI Trends in Virus Control" 1991 IEEE Proc. of Southeaston pp. 99–103 vol. 1.
Crocker et al. "A Proposal for a Verification-Based Virus Filler" 1989 IEEE Symposium on Security & Privacy pp. 319–324.
Kephort et al. "Directed Graph Epidemiological Module of Computer Viruses" 1991 IEEE Computer Society Symposium on Research in Security & Privacy pp. 343–359.
Kumor et al. "A Generic Virus Scanner in C++" 1992 8th Ann. Computer Security Applications Proceedings pp. 210–219.
Shoutkov et al. "Computer Viruses: Ways of Reproduction in MS DOS" 25th Ann. 1991 IEEE International Carnahan Conf. on Security Tech. pp. 168–176.

(List continued on next page.)

*Primary Examiner*—Robert W. Beausoliel, Jr.
*Assistant Examiner*—Joseph E. Palys
*Attorney, Agent, or Firm*—Perman & Green

[57] ABSTRACT

A method includes the following component steps, or some functional subset of these steps: (A) periodic monitoring of a data processing system (10) for anomalous behavior that may indicate the presence of an undesirable software entity such as a computer virus, worm, or Trojan Horse; (B) automatic scanning for occurrences of known types of undesirable software entities and taking remedial action if they are discovered; (C) deploying decoy programs to capture samples of unknown types of computer viruses; (D) identifying machine code portions of the captured samples which are unlikely to vary from one instance of the virus to another; (E) extracting an identifying signature from the executable code portion and adding the signature to a signature database; (F) informing neighboring data processing systems on a network of an occurrence of the undesirable software entity; and (G) generating a distress signal, if appropriate, so as to call upon an expert to resolve difficult cases. A feature of this invention is the automatic execution of the foregoing steps in response to a detection of an undesired software entity, such as a virus or a worm, within a data processing system. The automatic extraction of the identifying signature, the addition of the signature to a signature data base, and the immediate use of the signature by a scanner provides protection from subsequent infections of the system, and also a network of systems, by the same or an altered form of the undesirable software entity.

46 Claims, 7 Drawing Sheets

OTHER PUBLICATIONS

S. W. Shieh et al. "A Pattern-Oriented Intrusion-Detection Model and its Applications", Proceedings of the 1991 IEEE Computer Society Symposium on Reserach and Privacy, pp. 327–342.

H. S. Javitz et al. "The SRI IDES Statistical Anomaly Detector", Proceedings of the 1991 IEEE Computer Symposium on Research in Security and Privacy, pp. 316–326.

W. Arnold et al. "System for Detecting Undesired Alteration of Software", IBM TDB, vol. 32, No. 11, Apr. 1990, pp. 48–50.

S. M. Katz, "Estimation of Probabilities from Sparse Data for the Language Model Component of a Speech Recognizer", IEEE Trans. ASSP-35, No. 3, Mar. 1987, pp. 400–401.

F. Cohen, A Short Course on Computer Viruses, ASP Press, Pittsburg, 1990, pp. 9–15.

∗ INFECTED

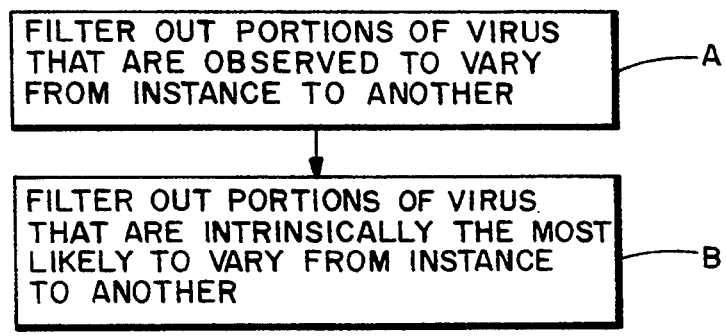
FIG. 4
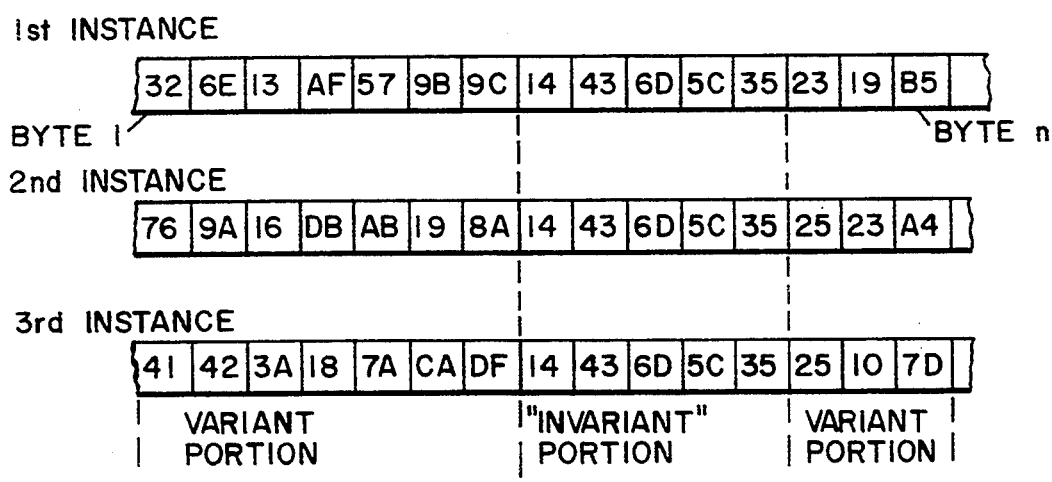
FIG. 6A
BYTE 1
8E DE 8C 06 01 00 8C C6 8E DE 31 C0
31 DB 31 C9 31 D2 CB F9 FB FF 6F F5
                                    BYTE 24
FIG. 6B

AUTOMATIC IMMUNE SYSTEM FOR COMPUTERS AND COMPUTER NETWORKS

CROSS-REFERENCE TO A RELATED PATENT APPLICATION

This patent application is related to commonly assigned U.S. patent application Ser. No. 08/004,871, filed Jan. 19, 1993, entitled "Methods and Apparatus for Evaluating and Extracting Signatures of Computer Viruses and Other Undesirable Software Entities", by Jeffrey O. Kephart

FIELD OF THE INVENTION

This invention relates generally to digital data processors and, in particular, to methods and apparatus for providing computational integrity for digital data processors and networks thereof.

BACKGROUND OF THE INVENTION

A computer virus has been defined by Frederick B. Cohen as a program that can infect other programs by modifying them to include a, possibly evolved, version of itself (*A Short Course on Computer Viruses*, ASP Press, Pittsburg, 1990, page 11).

As employed herein, a computer virus is considered to include an executable assemblage of computer instructions or code that is capable of attaching itself to a computer program. The subsequent execution of the viral code may have detrimental effects upon the operation of the computer that hosts the virus. Some viruses have an ability to modify their constituent code, thereby complicating the task of identifying and removing the virus.

A worm is a program or collection of programs that can cause a possibly evolved version of itself to be executed on the same or possibly on a different computer.

A Trojan Horse is a block of undesired code that is intentionally hidden within a block of desirable code.

Both computer viruses, worms, and Trojan Horses are considered to be members of a class of undesirable software entities, the presence of which within a data processor, or network of data processors, is to be avoided so as to maintain computational integrity.

A widely-used method for the detection of computer viruses is known as a virus scanner. A virus scanner employs short strings of bytes to identify particular viruses in executable files, boot records, or memory. The byte strings (referred to as signatures) for a particular virus must be chosen with care such that they always discover the virus, if it is present, but seldom give a "false alarm", known as a false positive. That is, the signature must be chosen so that the byte string is one that is unlikely to be found in programs that are normally executed on the computer. Typically, a human expert makes this choice by converting the binary machine code of the virus to an assembler version, analyzing the assembler code, selecting sections of code that appear to be unusual or virus-like, and identifying the corresponding bytes in the binary machine code so as to produce the signature. Wildcard bytes can be included within the signature to provide a match with any code byte appearing in a virus.

Currently, a number of commercial computer virus scanners are successful in alerting users to the presence of viruses that are known apriori. However, conventional virus scanners are typically unable to detect the presence of computer viruses which they have not been programmed to detect explicitly. The problem of dealing with new viruses has typically been addressed by distributing updates of scanning programs and/or auxiliary files containing the necessary information for identifying the latest viruses. However, the increasing rate at which new viruses are being written is widening the gap between the number of viruses that exist and the number of viruses that can be detected by an appreciable fraction of computer users. As a result, it is becoming increasingly likely that a new virus will become wide-spread before any remedy is generally available.

At least one mechanism to inform other computers connected to a network of a presence of a viral infection has been previously advanced. For example, a "net hormones" concept has been proposed by David Stodolsky, wherein every computer on a network keeps archives of all potential virus-carrying contacts with every other computer. When a computer finds that it is infected with a virus, it sends a message to every computer that it has ever contacted or been contacted by, which in turn send messages to all of their contactees or contactors, etc. However, it is believed that this approach will result in most or all computers quickly becoming overloaded by infection messages from most of the other computers on the network.

As such, a need has arisen to develop methods for automatically recognizing and eradicating previously unknown or unanalyzed viruses on individual computers and computer networks. An efficient method is also required for informing other computers on the network as to the existence of a computer virus within the network.

It is an object of this invention to provide methods and apparatus to automatically detect and extract a signature from an undesirable software entity, such as a computer virus or worm.

It is further object of this invention to provide methods and apparatus for immunizing a computer system, and also a network of computer systems, against a subsequent infection by a previously unknown and undesirable software entity.

SUMMARY OF THE INVENTION

The foregoing and other problems are overcome and the objects of the invention are realized by a method that provides computational integrity for a digital data processor and a network of digital data processors. The method includes the following component steps, or some functional subset of these steps:

(A) periodic monitoring of a data processing system for anomalous behavior that may indicate the presence of an undesirable informational state, such as one arising from the presence of an undesirable software entity, such as a computer virus or worm;

(B) automatic scanning for occurrences of known types of undesirable software entities;

(C) deploying decoy programs to capture samples of unknown types of computer viruses;

(D) automatically identifying portions of a captured virus sample which are likely to remain invariant from one instance of the virus to another;

(E) extracting an identifying signature from the invariant portion and adding the signature to a signature database;

(F) informing neighboring data processing systems on a network of an occurrence of the undesirable software entity; and (G) generating a distress signal, if appropriate, so as to call upon an expert to resolve difficult cases.

A feature of this invention is the automatic execution of the foregoing steps in response to a detection of an undesired software entity, such as a virus, worm, or Trojan Horse, within a data processing system. Furthermore, the automatic extraction of the identifying signature, and the addition of the signature to a signature data base, provides protection, or "immunity", to subsequent infections of the system, and also a network of systems, by the same or an altered form of the undesirable software entity.

BRIEF DESCRIPTION OF THE DRAWING

The above set forth and other features of the invention are made more apparent in the ensuing Detailed Description of the Invention when read in conjunction with the attached Drawing, wherein:

FIG. 1b illustrates an exemplary computer network that includes the computer system of FIG. 1a;

FIG. 4 is a flow chart depicting a method for use in segregating variant virus portions from invariant virus portions;

FIG. 6a illustrates exemplary portions of three instances of a computer virus, the three portions each including an invariant portion and variant portions;

FIG. 6b illustrates an exemplary 24-byte "invariant" portion of a computer virus;

DETAILED DESCRIPTION OF THE INVENTION

Figure 1A:
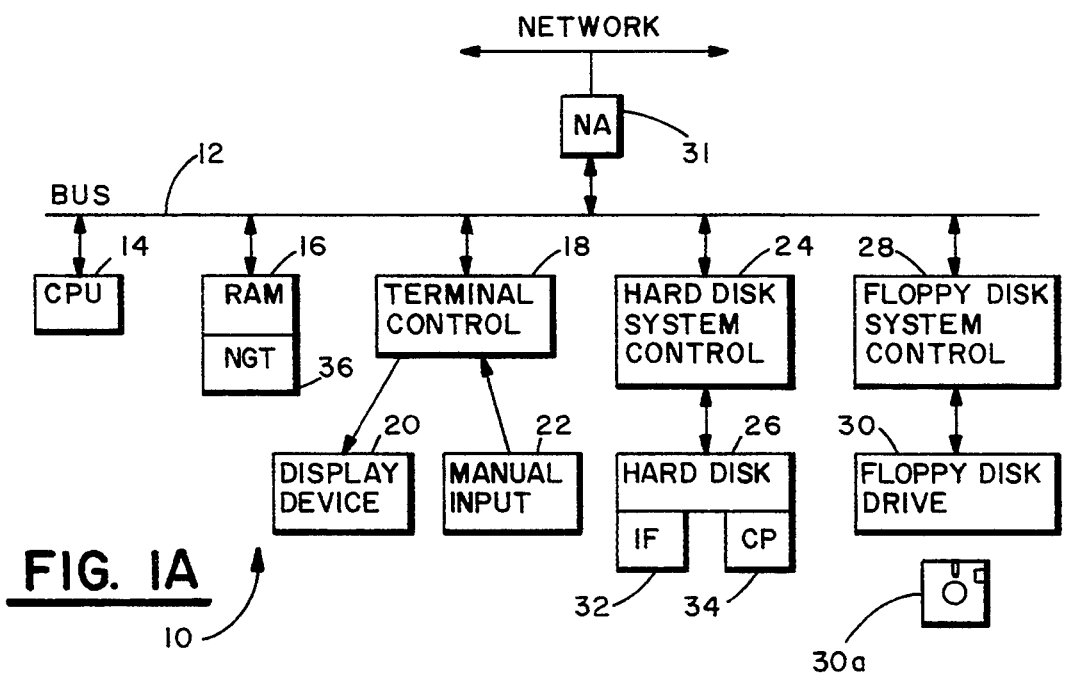
FIG. 1a is a block diagram of a computer system that is suitable for use in practicing the invention.

FIG. 1a is a block diagram of a data processing system 10 that is suitable for practicing the teaching of the invention. A bus 12 is comprised of a plurality of signal lines for conveying addresses, data, and controls between a Central Processing Unit 14 and a number of other system bus units. A RAM 16 is coupled to the system bus 12 and provides program instruction storage and working memory for the CPU 12. A terminal control subsystem 18 is coupled to the system bus 12 and provides outputs to a display device 20, typically a CRT monitor, and receives inputs from a manual input device 22, typically a keyboard. Manual input may also be provided from a pointing device, such as a mouse. A hard disk control subsystem 24 bidirectionally couples a rotating fixed disk, or hard disk 26, to the system bus 12. The control 24 and hard disk 26 provide mass storage for CPU instructions and data. A floppy disk control subsystem 28 bidirectionally couples one or more floppy disk drives 30 to the system bus 12. The floppy disk drive 30 works in conjunction with a removable floppy diskette 30a. A network adapter (NA) 31 is provided for coupling the system 10 to a network.

The components illustrated in FIG. 1a may be embodied within a personal computer, a portable computer, a workstation, a minicomputer, a main frame computer, or a supercomputer. As such, the details of the physical embodiment of the data processing system 10, such as the structure of the bus 12 or the number of CPUs 14 that are coupled to the bus, is not crucial to the operation of the invention, and is not described in further detail below.

As employed herein, the informational state of the data processing system 10, at a given moment in time, is considered to be defined by the contents (bytes) of all memory or storage devices to which the system has access. These include, but are not limited to, RAM, registers, hard disks, floppy disks that are inserted into floppy disk drives, and magnetic tape that is inserted into a tape drive.

The informational state history of the system 10 is considered to be the history of its informational state at all moments in time.

For the case where the data processing system 10 (P1 of FIG. 1b) is connected to other data processing systems (P2-P7) via a network, such as the exemplary network depicted in FIG. 1b, an additional data processor ($P_D$) may be added as a dedicated decoy program server, as described below.

Figure 2:
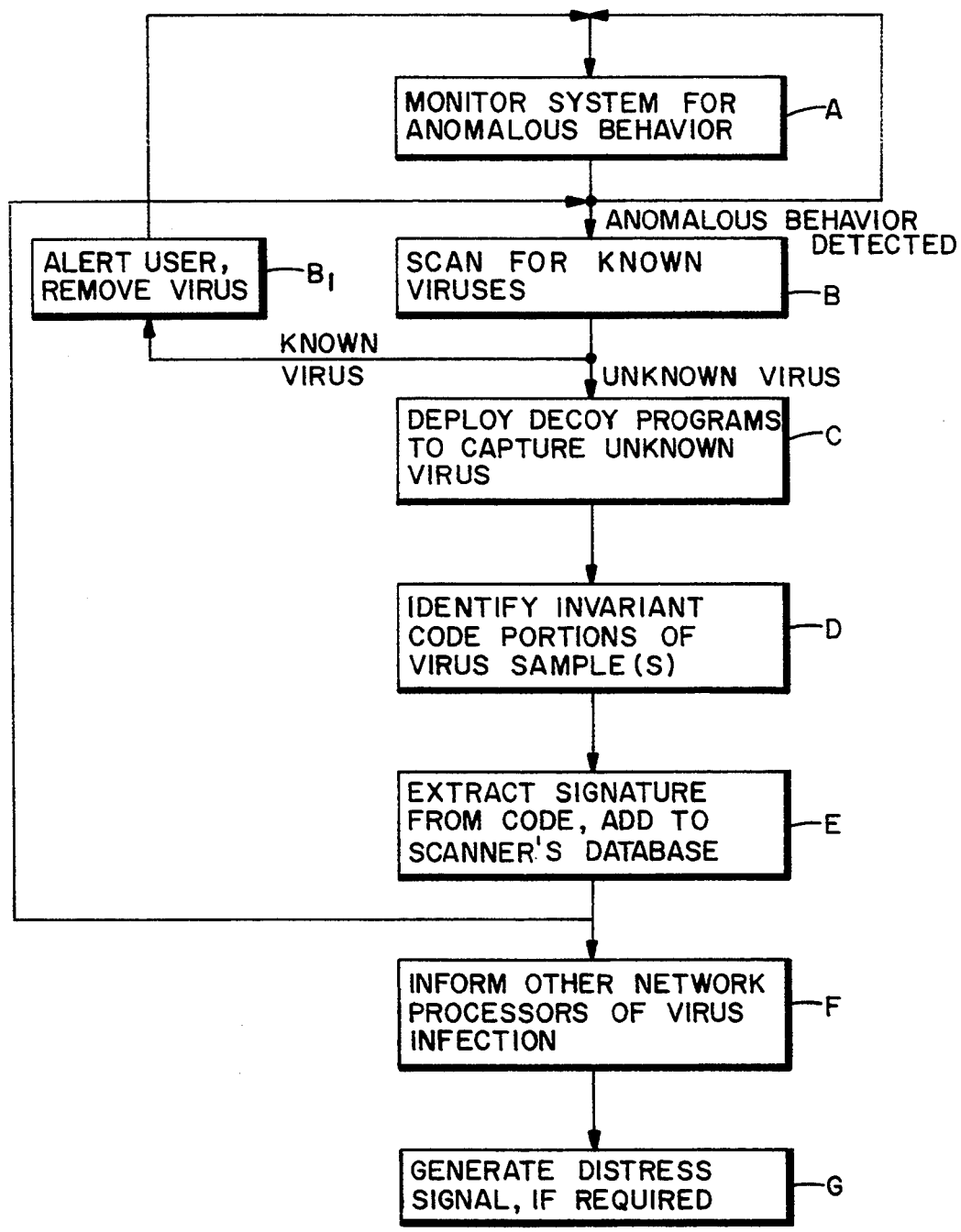
FIG. 2 is a flow chart depicting the constituent steps of a method of the invention.

The method of this invention includes the following component steps, as illustrated in FIG. 2, or some functional subset of these steps.

Step A: Periodic monitoring of the data processing system 10 for anomalous, potentially virus-like behavior.

Step B: Automatic scanning for occurrences of known viruses, and removal of any which are found to be present.

Step C: Deployment of decoy programs to capture virus samples.

Step D: Segregation of a captured virus sample into portions that are likely to vary from one instance of the computer virus to another instance, and into portions that are likely to be invariant from one instance to another.

Step E: Extraction of a viral signature from the invariant portion(s) and the addition of the signature to a signature database.

Step F: Informing neighboring data processing systems on a network of an occurrence of a viral infection.

Step G: Generation of a distress signal, if appropriate, so as to call upon human experts to resolve difficult cases.

A feature of this invention is the automatic execution of the foregoing steps in response to a detection of an undesired software entity, such as a virus or a worm, within the data processing system 10.

A discussion is now made of each of the above referenced Steps A-G of FIG. 2.

Step A: Anomaly Detection

The first step in the process of this invention detects anomalous system behavior of a type that may indicate the presence of an undesirable informational state resulting from the presence of a virus or some other undesirable software entity, such as a worm or a Trojan Horse. The detection of anomalous behavior within a computer or computer network can be accomplished through the use of known techniques, preferably a technique that detects anomalies that may indicate a virus. One suitable anomaly detection technique, that uses patterns of activity undertaken by computational processes, is described in an article entitled "A Pattern-Orientated Intrusion-Detection Model and its Applications", S. W. Shieh and V. D. Gligor, Proceedings of the 1991 IEEE Computer Society Symposium on Research in Security and Privacy". Another suitable technique detects unexpected changes in executable or resource files. As an example, F. Cohen, *A Short Course on Computer Viruses*, ASP Press, Pittsburg, 1990, discusses the use of integrity shells employing modification detectors. In this case, modification of files is detected by cryptographic or non-cryptographic checksums, and the user is notified if a modification is detected.

The method at Step A may employ any one or a combination of these or similar techniques. The end result is the detection by the system 10 of an anomalous system behavior that may be indicative of the presence of a computer virus, or some other undesirable software entity.

The anomaly detection process or processes may be run continually as a background task, or periodically as a foreground task, depending on the desire of the user and/or the nature of the underlying operating system.

Step B: Scan for Known Viruses

If preliminary evidence of virus-like activity is detected, additional computational resources are devoted to obtaining more conclusive evidence of viral infection. If a virus is present, there is a high probability that the virus is a well-known virus that can be readily detected by a virus scanner. Thus, Step A scans an informational state history of the system, that is, all relevant media (e.g. files, boot records, memory), for known viruses. In one implementation, a pre-existing virus scanner is activated to search for a large set of patterns or signatures, each of which pertains to a different virus or virus family. It is highly desirable (but not essential) that the virus scanner be capable of detecting slight variations on known viruses. Many conventional scanners tend to possess this capability, to a limited extent, simply by virtue of the fact that they search based only on short contiguous strings of bytes found in the virus.

One especially suitable virus scanner, known as VIRSCAN, was available from the International Business Machines Corporation until recently, when it was incorporated into the IBM AntiVirus program. This virus scanner is particularly useful for detecting variations in known viruses because it permits a certain number of mismatches between a string of bytes in a file being examined and the virus signature string. This capability reduces the chance of having to proceed to Step C (decoy deployment), and is even more useful in the event that the virus is completely unrelated to any known virus, as is described below with respect to Step E. If the anomaly is found to be due to a known virus or some slight alteration of it, the method proceeds to Step B₁ where the user is alerted, and the virus removed (killed) by traditional methods, such as restoration from backup (either automatically or manually by the user) or disinfection (removal of the virus from all of the software it has infected.) In general, disinfection is only acceptable if the virus is found to be an exact copy of a known virus. This implies that the system verify the identification made by the virus scanner.

Step C: Decoy Deployment

If no known virus is detected, the anomaly may be due to some unknown virus. In this case, the method employs one or more decoy programs in an attempt to attract and obtain one or more samples of the unknown virus. The decoy programs could be commercially-available computer programs which are installed on (and are capable of being executed on) the computer system. Preferably, however, they would be special-purpose programs which exist solely for the purpose of capturing viruses.

For the case of a DOS-based system, a variety of decoy programs having *.COM and *.EXE extensions (also referred to as executables) are created, executed, read, written to, copied, etc. The use of decoy programs for this purpose is described by W. C. Arnold and D. M. Chess in "System for Detecting Undesired Alteration of Software", IBM Technical Disclosure Bulletin, Vol. 32, No. 11, pages 48–50, April 1990.

In operation, original copies of the decoy programs are stored securely, by example in encrypted form or on a separate server, along with checksums of the originals. After a specified time interval, or after other specified conditions are met, checksums of some or all of the decoy programs are taken and compared directly to their originals. Alternatively, the decoy programs are compared directly to their originals. If none of the decoys are found to have changed, the user is alerted to the fact that an anomaly of some sort was detected, but that the system was unable to find conclusive evidence of a virus. In this case, it is desirable to maintain the system in a moderate state of alert for some time period, exercising the decoy programs at a reduced priority or less frequent intervals.

It is desirable to have a large variety of decoy programs that differ from one another in length, content, and name. Furthermore, the decoy programs should be placed in and run from various directories, particularly those directories in which there are modified executables.

Some DOS viruses are known to become resident in memory and are active until the computer is rebooted. In such a case, the virus is able to infect any executable at any time. Often, a resident virus will infect executables as they are brought into memory to be executed. Thus, if several decoy programs are run, there is a reasonable chance that one or more decoy programs will be infected by such a virus. In addition to running the decoys, the system should perform a variety of other operations with the decoy programs, including copying them, opening them, creating them, etc. All of these operations increase the probability of infection by a virus that is resident in memory.

However, some DOS viruses do not go resident, and can infect other programs only when the host program in which the virus is imbedded is executed. Such viruses typically use static criteria for selecting a program to infect, such as the program name or the directory in which the program is located. In this case, it is more difficult for the decoy programs to become infected. To increase the chance of infection, decoy programs are preferably placed in locations where they are more likely to be selected, such as the directory of the possibly-infected executable, or directories containing system programs (e.g. the root directory) and commonly-used utility programs. In order to infect the decoy programs, the potentially-infected executable should be run repeatedly.

If one or more decoy programs is subsequently found to have changed from the original, protected version, it can be assumed that the changes are due to a virus. A comparison of each modified decoy program with its corresponding uninfected version enables a copy of the virus to be isolated from each decoy.

Step D: Identification of Invariant Code Portions

In order to maximize the likelihood that a chosen signature will appear in all or nearly all progeny of the virus, it is preferred to filter out all portions of the virus which are observed to or are likely to vary from one instance of the virus to another. To achieve this, the method employs one, or preferably both, of the techniques represented as Blocks A and B in FIG. 4. The order in which the two techniques are used can be reversed, and the following description is correspondingly modified to accommodate the opposite ordering of the two techniques.

If several decoy programs are found to be infected, a most desirable case, it is important to compare the various versions of the isolated virus programs with one another (Block A). If all versions are identical, or if there is only one version, the entire virus is considered to be "invariant", and can be passed along to block B Otherwise, if the various isolated computer virus programs differ, but have substantial areas in common, it can be assumed that the virus alters itself when it replicates. As a result, only the common areas are marked for further examination by the heuristics employed in Block B of FIG. 4. This procedure is illustrated in FIG. 6a, in which the variant and "invariant" portions of a virus are identified by comparing three instances of it. In FIG. 6a, each byte is shown expressed in a hexadecimal representation, and an invariant portion is identified. The length of the invariant sequence of bytes is exemplary. In practice, invariant sequences of bytes are often considerably longer than five bytes, and more than one such portion typically appears within the virus. If there are no substantially similar areas, this may indicate the presence of a relatively sophisticated self-altering virus, or the presence of more than one virus. In this case, each of what appear to be different viruses are provided separately to the extraction method, which determines one or more signatures for each. The system is also placed in a moderate state of alert, and the user is informed.

It is noted that a situation may arise in which the computer is attacked by a sophisticated, unknown virus, every instance of which looks completely different. In this case, at the completion of Block A in FIG. 4 the virus detector may be unable able to determine whether there are several viruses, or one virus that appears different every time it is replicated. The use of a distress signal, described below in relation to Step G, may be appropriate for this situation.

At this point, there are one or more sections of a virus program (or a set of different viruses) that are marked as being substantially "invariant". However, even if a given section of the virus program is common to all copies which have been obtained in Step C, this does not guarantee that the section will appear in its entirely in every instance of the virus. The purpose of Block B is to filter out portions of the "invariant" sections which by their nature are more likely to be variable. As a general rule, non-executable "data" portions of programs, which can include representations of numerical constants, character strings, screen images, work areas for computations, addresses, etc., tend to be more likely to vary from one instance of the program to another than "code" portions, which represent machine instructions. It may be that most or all of the "data" bytes in a given virus are the same in all instances of that virus, but without a careful analysis this is difficult to establish with certainty. Thus, a conservative approach assumes that "data" bytes may change, and therefore it is desirable to disqualify them from being chosen as portions of candidate signatures. Perfect classification of each byte as being "code" or "data" is not necessary. An erroneous classification of "code" bytes as "data" bytes is more tolerable than an erroneous classification of "data" bytes as "code" bytes.

By example, FIG. 6b illustrates a 24-byte "invariant" portion of a virus sample that was generated at Step C. The first 4 bytes represent machine instructions, bytes 5 and 6 represent data, bytes 7-19 represent code, and bytes 20-24 represent data. Thus, if Block B of FIG. 4 were employed, only bytes 1-4 and 7-19 would be passed along to Step E for signature extraction.

Suitable methods of code-data segregation include, but are not limited to, the following techniques.

1. Conventional static disassembly techniques, such as flow analysis.

2. Simulation of marked viral code in a virtual machine, wherein the virtual machine includes a hardware and software model of the computer or class of computers for which the virus signature is being obtained.

3. Running the marked viral code through an interpreter or debugger to determine which bytes are actually executed. This method requires a "safe" environment in which to run the virus, such as the dedicated server $P_D$ referred to above in the discussion of FIG. 1b.

4. Statistical classification techniques.

The second method, i.e., simulation of the marked viral code in a virtual machine, is the safest and most reliable, but is often the most computationally intensive.

The second and third methods each have the advantage that they are capable of determining whether a virus is self-modifying. Viruses that modify themselves often do so for the purpose of obscuring their machine code portions by making the code appear different from one instance of the virus to the next. Such viruses are often referred to as self-garblers. Self-garblers typically consist of a short decrypting "head" portion followed by code which is transformed in an easily-invertible manner (e.g. XOR'ed) using a randomly-chosen decryption key when the virus is replicated. Thus, the only portion of the code which remains invariant, from one instance of the virus to another, is the head. It is helpful to know that a virus is self-modifying (and thus potentially self-garbling), so that signatures will only be drawn from the decrypting head. This information can also be helpful in identifying cases in which what appeared to be several different viruses in Step C are actually only different instances of a single, self-garbling virus.

At the conclusion of Step D, there exists one or more sequences of bytes which appear in every instance of the one or more viruses that were obtained or generated at Step C and which, according to any heuristics employed in Block B, are deemed likely to appear in most or all possible instances of the virus. The set of candidate viral signatures are all possible contiguous blocks of S bytes found in these "probably-invariant" or "substantially invariant" byte sequences, where S is a signature length specified by the user or determined by the system. Typically, S has a value in the range of approximately 12 bytes to 36 bytes. The "probably-invariant" byte sequence(s) may be provided an an input file (IF 32, FIG. 1a) for subsequent processing by the signature extraction technique described below.

There may be several viruses (or virus signatures) of interest. As such, a record is maintained of which candidate signatures belong to each virus.

Step E: Signature Extraction

In general, the signature extraction method searches through the "probably-invariant" sections of virus code for the n best possible signatures (where n is typically small, and perhaps 1). A "good" viral signature is one which is statistically unlikely to generate false positives when run on uninfected, legitimate programs, but will always identify the virus if it is present. Depending on the nature of the virus scanner which will employ the resulting signature, other criteria may be combined with this criterion to evaluate the desirability of a given candidate signature. Another desirable property is that the signature be flexible enough to allow for the detection of slight alterations in the viral code. This is especially useful because the decoys may not have captured the full range of variation of a particular virus. This is the reason that the virus scanner referred to in Step B should be capable of detecting slightly-altered versions of viruses. This may be accomplished by permitting some number of mismatched bytes, or by selecting a collection of substrings (fragments) of the signature and requiring that some number of them be found before declaring a virus to be present. String-matching is but one suitable technique for detecting slight alterations. Statistical measurements of viral code (such as n-gram frequencies) and various transformations of them (such as singular value decomposition) also provide a mechanism to recognize close kinship between two functionally similar instances of a virus that would appear very different to a string scanner.

A presently preferred method for automatically extracting viral signatures is disclosed in the above-referenced commonly assigned U.S. patent application Ser. No. 08/004,871, filed Jan. 19, 1993, entitled "Methods and Apparatus for Evaluating and Extracting Signatures of Computer Viruses and Other Undesirable Software Entities", by Jeffrey O. Kephart.

Briefly stated, the technique disclosed in this commonly assigned U.S. Patent Application implements a signature scoring technique which processes a large corpus of typical programs, such as PC-DOS and OS/2 binary executables, collects statistics on n-gram frequencies, and uses this information to estimate the probability of finding a given sequence of bytes (with a specified number of allowed mismatches) in the programs of the corpus. Once the signatures have been extracted, they are added permanently to a database used by the virus scanner, and all relevant media are scanned and cleaned up as in Step B.

In greater detail, the automatic signature extraction method operates to identify one or more signatures which have (a) estimated "false-positive" probabilities which are below a predetermined threshold, (b) which are among the lowest of all the candidate signatures, and (c) which may satisfy other specified criteria as well (for example having as the first two bytes an unusual and rarely occurring byte combination). In that it is technically impossible to verify a signature against all programs that have ever been written or that ever will be written, the probability estimation is preferably based on a corpus of software programs in common use on the particular hardware and operating system on which the virus scanner is to be used. This corpus of programs is used to extrapolate from a subset of the programs in existence to the much larger set of possible programs.

DESCRIPTION OF THE SIGNATURE EXTRACTION PROCEDURE

In a first step, the system 10 supplies one or more input files (IFs 32), each containing one or more substantially invariant portions of viral code from which one or more virus signatures are to be extracted. The input files are preferably generated by automatic creation of the files by software programs, including the decoy deployment and code/data segregator of Steps C and D.

Furthermore, there is provided the corpus of software programs in common use on the particular hardware and operating system targeted by the computer virus(es) of interest. For example, for viruses which affect IBM PCs and compatibles running DOS (disk operating system), the corpus includes a number of executable programs (typically stored as files with .COM and .EXE extensions). In the preferred embodiment of the invention, the corpus of programs (CP 34 of FIG. 1) is stored on a storage device, such as the hard disk 26, that is accessible by the computer system on which the method is executed. An alternative implementation, described in detail below, permits the corpus to be stored elsewhere. In this case, a file containing a properly digested version of the corpus is stored on a storage device which is accessible by the computer system on which the method is to be executed. This file is referred to as a table of n-gram probabilities, and is discussed in greater detail below.

Finally, the method described below can be automatically invoked and executed on the data processing system 10, or can be manually started, typically by issuing the appropriate command via the input device 22. A computer program that implements the method of the invention can also be stored on the hard disk 26 or the floppy disk 30a and, in response to an invocation of the program is loaded from disk to the RAM 16. The CPU 14 then executes the program. It may be necessary to supply input parameters to the method by inputting either the parameters themselves or the name of input files containing the parameters. These input parameters can include, by example, a predetermined threshold value for probability estimation and the file name(s) of the IF 32.

It should be realized that system 10 that executes the method of the invention need not be the same system for which one or more valid virus signatures are being generated for use by a virus scanner program.

Figure 5:
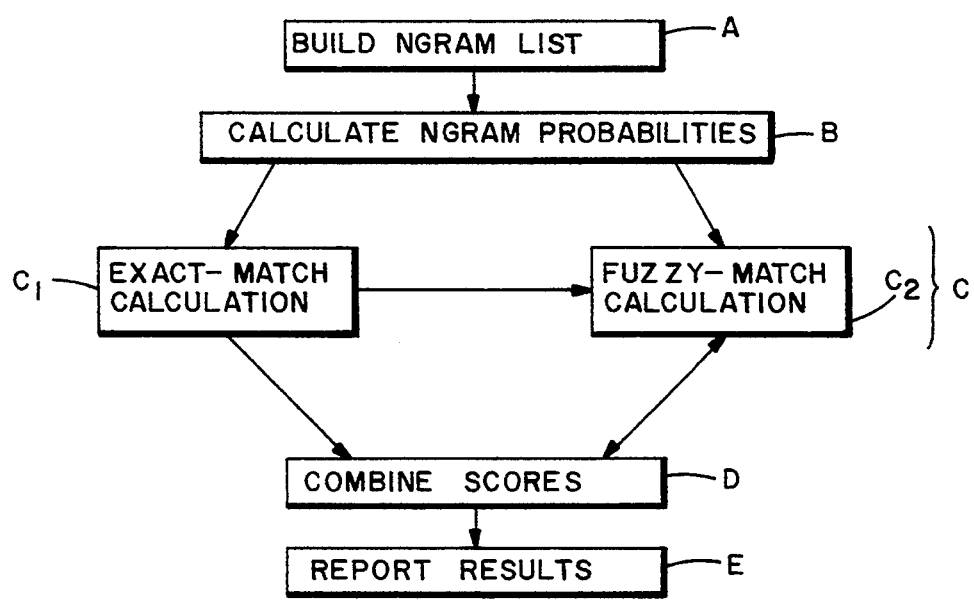
FIG. 5 is a flow chart that shows the operation of a statistically based computer virus signature extraction method.

Reference is now made to FIG. 5 for a general description of the steps of the method.

At Block A, a list is formed of all n-grams contained in the IF 32 data. An n-gram is an instance of n consecutive bytes, where n=1 (uni-gram) to some arbitrarily large value. Typically n is in the range of 3 to 8. The IF 32 is comprised of sections of previously identified invariant portions of virus machine code.

At Block B the probabilities are estimated for all n-grams in the list of n-grams by comparing the n-grams to the CP 34.

At Block $C_1$, for each candidate signature, an estimate is made of the probability of an exact match and-/or at Block $C_2$ the probability is estimated of a specified set of non-exact or fuzzy matches (e.g., matches to the signature or some contiguous fragment of it, given a specified number of mismatches).

At Block D, the estimated exact-match and fuzzy-match probabilities are combined to obtain an overall evaluation of each candidate signature.

At Block E, the method reports the outcome for some subset of the candidate signatures. The output report can be displayed on the display device 20 and/or stored in a file on the hard disk 26 or floppy disk 30a for subsequent review by an operator. The report is also provided as an input to other software programs, in particular a virus scanner, which makes use of the signature(s) contained in the report.

The foregoing Blocks A-E are now described in greater detail.

BUILDING A LIST OF THE REQUIRED N-GRAMS (FIG. 5, Block A)

At this point there are one or more sections of segregated virus code (binary machine code) from each of one or more viruses. As was noted, it is desirable to eliminate any large variable areas from these sections, leaving only those invariant portions which represent machine instructions.

One suitable procedure for extracting the n-grams and placing them into an n-gram table (NGT 36 of FIG. 1a) is expressed in the following pseudo-code.

Procedure: Build_Ngram_List

For each virus
  For each section of virus code
    For i=1 to length_of_section
      For n=1 to $n_{Max}$
        If (i+n−1<length_of_section)
        n-gram=bytes i through i+n−1 of section
        If (n-gram is not in n-gram_table)
          Store n-gram in n-gram_table The n-gram table 36 is maintained in, by example, the RAM memory 16 and/or in a file stored on the hard disk 26 or the floppy disk 30a. The term length_of_section is the length of a given section of virus code in bytes, and $n_{Max}$ is a chosen maximum length, in bytes, of the n-grams. Typical values for $n_{Max}$ are in the range of 3 to 8.

It is noted that under some circumstances an n-gram may include one or more wildcards, wherein a wildcard is considered a don't-care byte or bytes. For example, if the $i^{th}$ byte in a signature is a wildcard, this indicates that any byte is considered to match the $i^{th}$ byte. Wildcards are included in some virus signatures to provide greater robustness to variations in the virus, as described below.

ESTIMATING THE N-GRAM PROBABILITIES (FIG. 5, Block B)

Having obtained a list of all of the n-grams, the list being stored in the n-gram table 36, the next step estimates a probability of the correctness of each of the n-grams. The signature extraction procedure uses either of two general estimation methods.

Estimation Method 1

One presently preferred approach to n-gram probability estimation searches the entire corpus of programs 34 for only those n-grams that are listed in the n-gram_table 36. This method tallies the frequency of occurrence of each n-gram within the corpus 34 and inserts the occurrence frequency into the n-gram_table 36.

More specifically, what follows is a method for collecting n-gram statistics:

(a) For each n-gram $B_1B_2 \ldots B_n$ in the n-gram_table 36, record $f(B_1B_2 \ldots B_n)$, the number of occurrences of the n-gram in the corpus 34 (this can be implemented efficiently using a hash table).

(b) Record also in the n-gram_table 36 the number of n-grams of length n, $T_n$.

For uni-grams (n=1), the estimated probability is simply taken to be the observed frequency: $p(B_1)=f(B_1)/T_1$. For n>2, the estimated probability is given by a weighted average of the observed frequency and the probability calculated by combining together shorter n-grams. A preferred method used to combine two (n−1)-gram probabilities and an (n−2)-gram probability to form an n-gram probability is:

$$p(B_1B_2 \ldots B_n) = \frac{p(B_1B_2 \ldots B_{n-1})p(B_2B_3 \ldots B_n)}{p(B_2B_3 \ldots B_{n-1})} \quad (1)$$

Thus, the method for calculating n-gram probabilities is given by:

Procedure: Calculate n-grams $$p(B_1B_2 \ldots B_n) = a_{f(B_1B_2\ldots B_n)} \frac{f(B_1B_2 \ldots B_n)}{T_n} + \quad (2)$$

$$(1 - a_{f(B_1B_2\ldots B_n)}) \frac{p(B_1B_2 \ldots B_{n-1})p(B_2B_3 \ldots B_n)}{p(B_2B_3 \ldots B_{n-1})}$$

where $\alpha f(B_1B_2 \ldots B_n)$ is a heuristic weighting function which depends upon how many occurrences of $B_1B_2 \ldots B_n$ appear in the corpus 34. The weighting function $\alpha_m=0$ when m=0 and $\alpha_m=1$ when m>1 has been found to work well in practice. In order to apply Eq. 2 for n=2, the 0-gram probability is defined as unity. In practice, the uni-gram and bi-gram (n=1 and n=2, respectively) probabilities are tabulated first, and are then employed to determine the tri-gram (n=3) probabilities. Next, the bi-grams and tri-grams are used to determine the 4-gram probabilities, etc., until finally there is determined the $n_{Max}$-gram probabilities from the ($n_{Max}$−1)-gram and the ($n_{Max}$−2)-gram probabilities.

Estimation Method 2

A second approach consults a pre-computed table 50 of n-gram probabilities (shown in FIG. 1b) and places the results in the n-gram table. The pre-computed table is used for any set of viral code portions, and is constructed by making a one-time pass through the corpus 34 to determine the number of times each n-gram appears in the corpus (for each n≤$n_{Max}$), and dividing by the large if $n_{Max}$>2, even if n-grams which never appear in total number of n-grams of length n in the corpus. However, the pre-computed table 50 could be infeasibly the corpus are omitted.

One solution to this problem stores a chosen subset of the n-grams and fabricates the remainder from shorter n-grams. One suitable subset is the K most common n-grams. Another suitable subset is the set of n-grams whose measured frequencies deviate by more than a given amount from that estimated by combining, in accordance with Equation 1, two $(n-1)$-grams and an $(n-2)$-gram.

In the second case, Equation 1 is applied iteratively by first using uni-gram and bi-gram probabilities to estimate the tri-grams, then bi-grams and tri-grams to estimate the 4-grams, etc., until finally the $n_{Max}$-gram probabilities are estimated from the $(n_{Max}-1)$-gram and $(n_{Max}-2)$-gram probabilities. At each stage, only the n-grams whose frequencies are poorly estimated by Equation 1 are included in the pre-computed table. The amount of computation is substantial, but is only required to be performed once, with possible periodic updates to take into account additions to the corpus of popular new programs compiled with new compilers.

A presently preferred method for determining the contents of the pre-computed table 50 of n-gram probabilities includes the following steps.

1. Tally the number of occurrences (the absolute frequency) of all 1-gram and 2-grams in the corpus 34; divided by T_1 and T_2 respectively to obtain the relative frequency of each 1-gram and 2-gram. Store all 1-gram and 2-gram frequencies in the pre-computed n-gram table.

2. For $k=3$ to some chosen maximum k,

Determine the relative frequency of each k-gram for which the first $(k-1)$ bytes are a $(k-1)$ gram in the pre-computed n-gram table. (This condition will hold for all 3-grams, but not necessarily for $k>3$).

Divide this observed relative frequency by the estimated frequency obtained from Eq. 1 using $(k-1)$ and $(k-2)$-grams.

If the absolute value of the logarithm of this quantity exceeds some chosen threshold, store the k-gram and its measured absolute frequency in the pre-computed n-gram table 50.

It should be noted that this is but one of several suitable methods for deriving the contents of the pre-computed table 50 of n-gram probabilities.

In general, estimation method 1 requires less storage and is more accurate than estimation method 2, but can require considerably more time to execute in that the entire corpus is searched every time that new sections of viral code are presented.

ESTIMATING THE CANDIDATE SIGNATURE PROBABILITIES (FIG. 5, Blocks C)

Depending upon the application, it may be desirable to estimate the probability of an exact match or a partial match (typically fragments or mismatches) between a candidate signature and some string of bytes in the corpus (or any statistically similar set of programs of comparable size). However, partial mismatch computations can be computationally expensive, and in the extraction mode the set of candidate signatures can be quite large. Therefore, depending upon the speed of the CPU 14, it may be desirable to employ only the exact-match probabilities to prune the set of candidate signatures. This is the reason for the arrow pointing from the exact-match calculation block ($C_1$) to the fuzzy-match calculation block ($C_2$). For example, the candidate signatures having the n lowest exact-match probabilities can be selected for further computation of fragment and mismatch probabilities.

As was noted above, the list of candidate signatures is constructed from the sections of segregated viral code. One suitable method selects some desired signature length S and treats each contiguous block of S bytes in each viral code section as a candidate. In this case, a suitable procedure for probability estimation of each candidate signature is given by the following pseudo-code.

Procedure: X_Probability_Extraction_Mode
For each virus
  For each section of virus code
    For i=1 to (length-of-section-S+1)
      For j=1 to S
        $B_j$=byte i+j−1
        Candidate signature=$B_1B_2 \ldots B_s$
        Store $p_X$(signature)=X_Probability($B_1B_2 \ldots B_s$)

where X denotes "Exact Match", "Fragment", "Mismatch", and possibly also some prepended qualifier describing alternate implementations of the indicated probability calculations.

Alternatively, S may be adjusted to the shortest length that satisfies a predetermined probability threshold.

The problem of estimating the probability that a proposed signature will exactly match a string of bytes in the corpus is next discussed, followed by a discussion of two types of partial matches, i.e., fragments and mismatches.

Probability of an Exact Match to a Given Signature:

In order to calculate the exact-match probability $P_{Exact-Match}$(signature) for a given signature, it must first be determined whether any bytes should be replaced by wildcards. In some processor architectures, there are instructions which contain addresses that can potentially vary from one instance of a program (in this case a virus) to another. In order to accommodate these potentially variable bytes, they should be replaced by wildcards. If it is intended to use the teaching of the invention in conjunction with a virus scanner that does not permit wildcards, the wildcards can still be inserted at this stage, in that the signature will be rejected at a later stage. The positions of any wildcards that are already present, or that were introduced at this step, are used in the exact-match probability calculation. The following pseudo-code describes a suitable implementation for determining the exact match probability.

Procedure: Exact_Match_Probability(signature)
Replace any potentially variable bytes in the signature with wildcards
W=number of wildcards in signature
Form list of wildcard positions: $P=(P_1, P_2 \ldots, P_w)$;
$P_i < P_j$ for $i < j$
$P_{Exact-Match}$(signature)=Calculate_Sequence_Probability(signature; P)

Calculate_Sequence_Probability(signature; P) is a procedure that estimates the probability $p(B_1B_2 \ldots B_s;P)$ of finding a byte-sequence $B_1B_2 \ldots B_s$ with wildcards in positions $P=(P_1P_2 \ldots ,P_w)$. The integers $P_i \leq S$ are in monotonically increasing order, and $0 \leq W$=number of wildcards $\leq S$.

One presently preferred implementation, described in the following pseudo-code, segregates the signature into contiguous blocks of bytes containing no wildcards. The probabilities of these contiguous blocks are then multiplied to give the exact-match probability for the signature.

Procedure: Calculate_Sequence_Probability(byte-sequence; P)
$P_o = -1$
$P_{k+1} = S+1$
p (byte-sequence; P) = 1
For j=0 to K
  byte-block = bytes $P_j+1$ through $P_{j+1}-1$ in byte sequence
  p (byte-sequence;P) = p(byte-sequence; P)* Calculate_Block_Probability(byte-block)

Calculate_Block_Probability(byte-block) is a procedure that estimates the probability $p(B_1B_2 \ldots B_K)$ of a contiguous, wildcard-free block of bytes $B_1B_2 \ldots B_k$ in the corpus. A preferred implementation is as follows:

Procedure: Calculate_Block_Probability(byte-block)

$$p(\text{byte-block}) = \begin{cases} p(B_1 \ldots B_K) & \text{if } K \leq n_{Max} \\ \dfrac{\sum_{i=1}^{K-n_{Max}+1} p(B_i \ldots B_{i+n_{Max}-1})}{\sum_{i=2}^{K-n_{Max}+1} p(B_i \ldots B_{i+n_{Max}-2})} & \text{if } K > n_{Max} \end{cases} \quad (3)$$

The condition $K > n_{Max}$ occurs when the length of the wildcard-free block exceeds the maximal size of the collected n-grams in the n_gram_table 36.

Fragments:

In order to enable a virus scanner to detect a slightly-altered version of a known virus, some virus scanners provide an indication when a contiguous block of F bytes in a signature of length S is found in the course of scanning. There are (S−F+1) possible fragments of this sort. Other criteria, such as requiring that the first few bytes of each fragment be less probable than a given threshold, can reduce the total number of fragments to a smaller subset of valid fragments. The quantity of interest in this case is the probability that none of the fragments in the subset will be found in the corpus, or in a statistically-similar set of programs of comparable size. It can be shown that a readily-computed upper bound on this probability is the sum of the probabilities of the individual fragments. The use of this estimated upper bound, rather than an estimated probability, introduces some inaccuracy, but is generally adequate and is much less computationally expensive than a more exact computation.

Thus, given a particular candidate signature $B_1B_2 \ldots B_S$ the following pseudo-code provides a procedure for estimating the overall fragment probability (actually its upper bound):

Procedure: Fragment_Probability(signature)
Replace any potentially variable bytes in signature with wildcards
$p_{Fragment}(\text{signature}) = 0$
For i=1 to (S−F+1)
  fragment = bytes ii through (i+F−1)
  If (fragment is valid fragment)
    W = number of wildcards in fragment
    Form list of wildcard positions in fragment:
    $P = (P_1, P_2 \ldots P_w); P_i < P_j$ for $i < j$
    p(fragment) = Calculate_Sequence_Probability(fragment; P)
    $p_{Fragment}(\text{signature}) = p_{Fragment}(\text{signature}) + p(\text{fragment})$ The above procedure is similar to that given for exact matches, except that there is an iteration over all fragments in the desired subset of possible fragments, and the overall fragment probability is an accumulation of the individual fragment probabilities.

Mismatches:

A further method for detecting altered versions of a known virus alerts the user when a string of bytes approximately matches the signature. More precisely, all but at most M bytes in the string match the byte in the corresponding position in the signature. In this case, an estimate is required of the probability of finding a signature with M or fewer mismatches to the candidate signature $B_1B_2 \ldots B_S$. A reasonable approximation to the M-mismatch probability is obtained by adding the probabilities of all of the combinatorial number of possible mismatch positions. For example, the probability of at most two mismatched bytes in a given string of S bytes (none of which are wildcards) is approximated by:

$$p_{M=2}(B_1B_2 \ldots B_S) \approx \sum_{i=1}^{S-1} \sum_{j=i+1}^{S} p( \ldots B_{i-1}X_iB_{i+1} \ldots B_{j-1}X_jB_{j+1} \ldots ) \quad (4)$$

where $X_i$ and $X_j$ represent what are referred to herein as variable-position wildcards in positions i and j, respectively. The sums run over all possible positions of i and j.

If there are already wildcards (which are be referred herein as fixed-position wildcards) in the candidate signature $B_1B_2 \ldots B_S$, the situation is slightly more complex. If the number of fixed-position wildcards, W, exceeds the number of allowed mismatches, M, the signature is invalid for M mismatches, and no further computation is necessary. If W=M, the M-mismatch probability is identical to the exact-match probability, the estimation of which has already been described. If W<M, then M−W variable-position wildcards are added to the W fixed-position wildcards. The probabilities of all of the combinatorial number of possible sets of M−W variable positions are added to obtain the M-mismatch probability. The following pseudo-code provides a presently preferred procedure for estimating the overall mismatch probability, which is designated $P_{Mismatch}(B_1B_2 \ldots B_S;M)$.

Procedure: Mismatch_Probability(signature ;M)
If desired, replace any potentially variable bytes in signature with wildcards.

W = number of wildcards
m = M − W

If (m ≤ 0)
  Error: Stop -- number of wildcards exceeds allowed mismatches

Else if (m=0)
  For i=1 to S+1
    For j=i to S+1
      Q(0,i,j) = Exact_Match_Probability ($B_i$ $B_{i+1} \ldots B_{j-1}$)
  $p_{Mismatch}(\text{signature};M) = Q(0,1,S+1)$ Else if (m>0)
  For i=1 to S+1−m
    For j=i+m to S+1
      Q(m,i,j) = 0
      For k=i to k=j−m
        If (k is not the index of any fixed-position wildcard)
          Q(m,i,j) = Q(m,i,j) + Q(0,i,k)* Q(m−1,k+1,j)

-continued $$p_{Mismatch}(\text{signature};M) = Q(m,1,S+1)$$

It should be noted that when m=0, the procedure Exact_Match_Probability is used to calculate exact-match probabilities Q(0,i,j) of all relevant sub-sequences of the candidate signature. Only Q(0,1,S+1), that is, the probability of the subsequence which consists of the entire signature, is required. However, the other probabilities Q(0,i,j) for i≠1 and j≠S+1are useful to calculate and retain for use in calculations with m>0.

When the number of variable-position wildcards m is non-zero, the probabilities Q(m,i,j) of all relevant sub-sequences of the signature with m variable-position wildcards can be expressed in terms of probabilities of sub-sequences of the signature with m−1, and with zero variable-position wildcards (Q(m−1,k+1,j) and Q(0,i,k) for all k for which the $k^{th}$ byte is not a fixed-position wildcard). Again, only the probability Q(m,1,S+1) is needed at this stage., but the other probabilities Q(m,i,j) for i≠1 and j≠S+1 are useful to calculate and retain for use in calculations with m replaced by m+1.

In practice, it would be most efficient to invoke the procedure Mismatch_Probability for M=W first. Note that this yields the exact-match probability. Then, one would invoke Mismatch_Probability for M=W+1, then M=W+2, etc., up to some value of M given by a predetermined function of the signature length S, a predetermined function of $p_{Mismatch}(\text{signature};M)$, or some other criterion.

COMBINING AND REPORTING THE RESULTS (FIG. 5, Blocks D, E)

In practice, the probability estimates for exact matches, fragments, and mismatches are generally somewhat inaccurate on an absolute scale, but for sufficiently large $n_{Max}$ the correlation between the probability estimates and the actual probabilities is good.

Depending upon the application, there are a number of possible ways in which the results of the various probability estimates can be combined into a final, useable result. One method assigns a score to a signature based on some combination of the three probabilities (and possibly the number of mismatches M as well), and then employs a predetermined threshold to accept or reject that signature.

If the signature is to be used in conjunction with a virus scanner that only permits exact matches, a suitable choice for the score would be just the exact-match probability. The signature is then accepted if its score is below some specified threshold and rejected otherwise.

If the virus scanner permits fragments and mismatches, a suitable choice for the score is the sum of the fragment and mismatch probabilities. This results in a slight overestimate of the probability of either a fragment or a mismatch, since the probabilities are not completely independent, but for the purposes of this invention this technique provides a reasonable approximation. Again, a threshold may be used to reject or accept the signature.

More sophisticated strategies can also be employed. For example, the fragment and M-mismatch probabilities are separately compared to a fragment threshold and to a M-mismatch threshold. If the fragment score is acceptable but the M-mismatch score is not, the virus scanner may allow matches on fragments but not M-mismatches, and vice versa.

Furthermore, instead of rejecting the M-mismatch score outright for some predetermined value of M, the procedure can determine the largest M for a given signature such that the M-mismatch probability is less than a given threshold. This approach requires some iterative interaction between this step and the mismatch calculation described previously.

Figure 7:
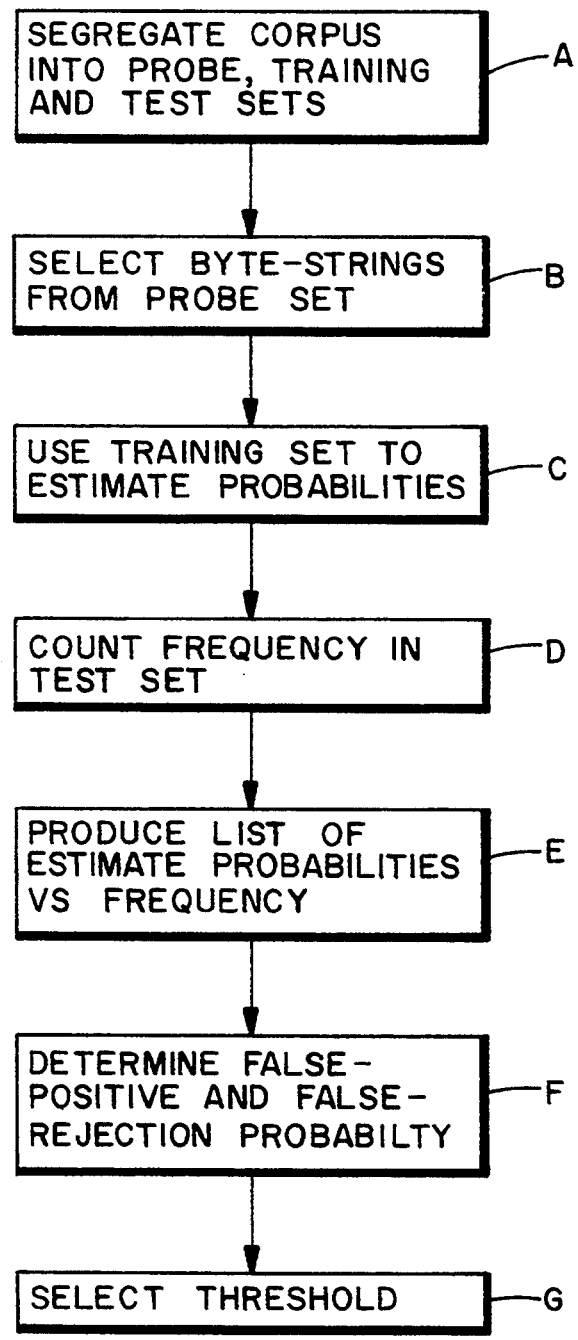
FIG. 7 is a flow chart that depicts a method of selecting a probability threshold used for accepting or rejecting a candidate signature.

If a threshold probability is employed, a presently preferred approach to choosing an appropriate threshold is shown in the flow chart of FIG. 7 and is described as follows.

First, at Block A the corpus 34 is segregated into three components: a probe set, a training set, and a test set. This can be done by randomly assigning programs in the corpus 34 to one of the three sets. The probe set may be relatively small; the training and test sets are preferably larger and approximately comparable to one another in size. At Block B the procedure randomly selects several (preferably several thousand or more) byte-strings from the probe set, each of the byte strings having a length comparable to a typical signature length S. Treating just the training set as the corpus, at Block C use the set of procedures described in detail above to estimate exact-match and the typical set of fuzzy-match probabilities for each signature. At Block D, count the frequency of each signature and each of the appropriate fuzzy matches to that signature in the test set.

At Block E, produce lists of, for each signature in the probe set, the estimated probability (obtained from the training set) vs. the measured relative frequency (obtained from the test set) for exact matches and for all of the desired types of fuzzy matches (e.g. fragments, 1-mismatches, 2-mismatches, etc.). To establish a reasonable probability threshold for each type of match, Block F performs the following calculations. First, for each of many (typically several dozen) closely-spaced probability thresholds T(i), it tallies $S_{bad(T)}$, the total number of signatures with estimated probabilities below T(i) which appeared one or more time in the test set. Next, for each of the specified probability thresholds T(i), it tallies $S_{total(T)}$, the total number of signatures with estimated probabilities below T. The false-positive probability for the threshold T is then given by FP (T) = $S_{bad(T)}/S_{total(T)}$.

Then, the total number of signatures $S_{good}$ from the probe set which never appeared in the test set (referred to as "good" signatures) is tallied. Next, for each T, the fraction GoodSigs(T) of "good" signatures with estimated probabilities less than or equal to T is calculated. At Block G there is selected (either automatically using set criteria or by the user) a threshold T for which the false-positive probability FP(T) is acceptably small (typically much less than 1%), but for which the fraction of signatures which are expected to be accepted by the threshold GoodSigs(T) is sufficiently large (i.e. 5% to 25% or more) to virtually guarantee that a valid signature can be found somewhere in the viral code.

To establish a reasonable probability threshold for each type of match, Block F calculates the percentage of signatures, with estimated probabilities below a specified threshold, which appeared in the test set one or more times. This yields the false positive probability for that threshold. At Block G there is selected a threshold which gives an acceptably small false-positive probability, but that does not exclude a significant number of the signatures.

To allow for the fact that the number of programs that exist or could exist exceeds the number of programs in the corpus 34 by a considerable margin, it may be desirable to diminish the threshold probability by a factor of 10 or 100. In practice this may be overly conservative, in that virus code tends to be written in assembler, and not the high-level languages in which most modern software applications are written. Thus, selection of thresholds based upon studies of probes taken from the corpus itself can be overly pessimistic for viruses, which are somewhat atypical software. In practice, even when the safety factor of 10 to 100 is not included, it is rare for the procedures of the invention to produce signatures yielding false positives.

In the described signature extraction procedure, there can be selected for each virus one or more candidate signatures having the best score(s). In this case, it may be desirable for the score to reward larger values of M, so that the chosen signatures capture the greatest possible amount of variation.

Other criteria for signature selection might be brought into play as well. In particular, it may be desirable favor signatures which increase the efficiency of the scanner that employs them. For example, the search methods used by some scanners can benefit if signatures are chosen in which the first few bytes are uncommon. One might therefore bias the scores of signatures to favor those which possess attributes that are deemed to be desriable.

The end result is the generation of a valid virus signature if the estimated probability of the occurrence of the candidate virus signature is less than a threshold probability, wherein the threshold probability has a value selected to minimize an occurrence of a false positive indication during the subsequent use of the valid virus signature by a virus scanner or similar virus identification technique.

As was noted above, the signature report(s) may be displayed on the display device 20 and/or are written to a database for use by the virus scanner. As soon as the signature for the previously unknown virus has been extracted, the scanner of Step B uses the signature to search for all instances of the virus in the system.

FIG. 2 Step F: Informing Neighboring. Computers

It has been demonstrated that informing one's neighbors if one is infected is highly effective in limiting or prevent viral spread. As seen in FIG. 1c, for the case where an infected computer is connected to others via a network, a "kill signal" (K) is transmitted from an infected computer to neighboring computers on the network. As employed herein, a neighboring computer is considered to be one or more with whom the infected computer communicates or exchanges software most frequently. This differs from the above referenced proposal that all computers with which the infected computer has ever communicated be notified.

The kill signal may take a variety of forms and provide as little or as much information as is appropriate or practical. For example, in one embodiment the infected computer simply sends an "I'm infected" signal (one bit of information) to its neighbor(s) whenever it enters Step B (Scan for Known Viruses), thereby inducing all of the neighbors to also enter Step B themselves. In another embodiment, the infected computer sends an "I'm infected" signal after it has cleaned itself up (completed Step B successfully), and also sends the name of the virus (if it was previously known) and its signature(s), whether the virus was previously known or not. The signature(s) may have been determined in Step E. In a further embodiment, the infected computer sends an "I'm infected" signal when it enters Step C, i.e., after it fails to identify the anomaly as a known virus, thereby inducing its neighbors to enter Steps B and C. Other strategies may also be used, other than those specifically detailed above. In all cases, the end result is that other computers on the network are alerted to the presence of an anomaly, which may be a known or an unknown virus, within the network.

It is noted that precautions are taken to ensure that the propagation of the kill signal itself does not become an epidemic in its own right. For example, a data processor that has received a kill signal from one or more of its neighbors sends a kill signal to its neighbors only if it is sufficiently certain that it is also infected. As seen in FIG. 1c, the kill signals propagate only as far as the non-infected computers P4 and P5 and, as a result, P6 and P7 are not made aware of the virus infecting P1, P2 and P3.

Step G: Generation of Distress Signal

No virus detector can detect every conceivable virus, as shown by F. Cohen through a simple adaptation of the halting problem contradiction in the above-referenced *A Short Course on Computer Viruses*. Thus, under certain circumstances the method of this invention may be required to inform the user that it is having difficulty. In the case of a computer network a mechanism is also provided for automatically alerting an expert as well.

An example of such a situation is one in which the computer is attacked by a sophisticated, unknown virus, every instance of which looks completely different. In this case, at the completion of Step C the virus detector may be unable able to determine whether there are several viruses or one virus that appears different every time it is replicated. The virus detector may operate on the assumption that there are really several different viruses, create signatures for each at Step E, then return to Step B to clean up. This approach may be suitable even if the decoy programs were infected by different instances of the same virus. However, it is more likely that the decoy programs will not have captured the full set of viral progeny, or even the full range of the subset of progeny which has infected the computer. In this case, anomalous behavior is again detected at Step A.

If the full set of possible progeny is sufficiently small (as it is even for the "Whale" virus, which takes a few dozen different forms), several passes through the method illustrated in FIG. 2 will eventually eradicate the virus and provide full immunity to any future attacks, in that the data base of virus signatures obtained from Step E will include a signature for each of the progeny of the virus. However, if the set of progeny is too large, the computer will suffer recurrent infections, and an appreciable fraction of its computational resources will be diverted almost solely to virus identification and eradication.

As such, the use of the distress signal is appropriate to alert the user and/or an expert to the existence of a confusing, potentially dangerous situation. The distress signal provides all pertinent details of the viral infection, such as the set of signatures extracted thus far, so that an expert, either human or software program, can identify the problem as quickly as possible.

The invention has been described thus far in the context of identifying and eliminating computer viruses from computers and networks of computers. However, the teaching of the invention can also be employed, with minor modification, for combatting worms. As employed herein, worms are considered to be self-replicating programs or collections of programs which are self-sufficient, and do not require a host program to infect.

In that a worm does not attach itself to an existing program, at least one component of the worm must be active in memory at any given moment. Thus, a most likely target of a worm is a network of multi-tasking computers, through which the worm propagates by spawning processes from one machine to another. For the case of worm detection and eradication, the teaching of the invention is modified as follows.

In Step A, i.e., periodic monitoring of the system for anomalous behavior, anomaly detection by behavioral patterns is the preferred method. However, even though worms do not necessarily rely upon modification of other executables, modification detection techniques may still be employed for detecting attempts by the worm to modify login or startup scripts to include invocations of itself. The user is informed of suspicious activity and given a choice as to whether to continue running or to suspend the offending process (and/or the family tree of processes to which it is related) pending further investigation.

If the user chooses to suspend the process, the method proceeds to Step B, in which that process, all parents or children of that process, and perhaps all other processes in memory, are scanned for known worms. Cleanup involves killing active worm processes (determined by tracing the process tree), and deleting worm executables and auxiliary files from storage media. Backup of files is not likely to be as necessary in this case, as it is for viruses, since a worm typically does not alter other executables. However, restoration of files may be necessary if the worm modifies scripts in order to invoke itself, or causes damage to other executable or data files.

Step C, decoy deployment, is not relevant in the case of worms in that the anomaly detector of Step A will have identified the suspicious processes and their parent and child processes.

Steps D and E, invariant code identification and automatic signature extraction, function in a manner as described above.

The use of the kill signal of Step F is especially valuable when combatting worms, in that worms are intrinsically capable of propagating through a computer network at higher speeds than a virus. This is because transmission of a worm between machines is initiated intentionally by a process, while a virus is typically transmitted unwittingly by a human being. Thus, the use of an automatic kill signal that is transmitted between machines is important to stop a rapidly-spreading worm.

The distress signal of Step G is also especially valuable when combatting worms, due to the high speed with which a worm can propagate over a network. Quickly bringing into play the abilities of a human or software expert to deal with novel situations is thus critical to stopping the spread of the worm.

Figure 3:
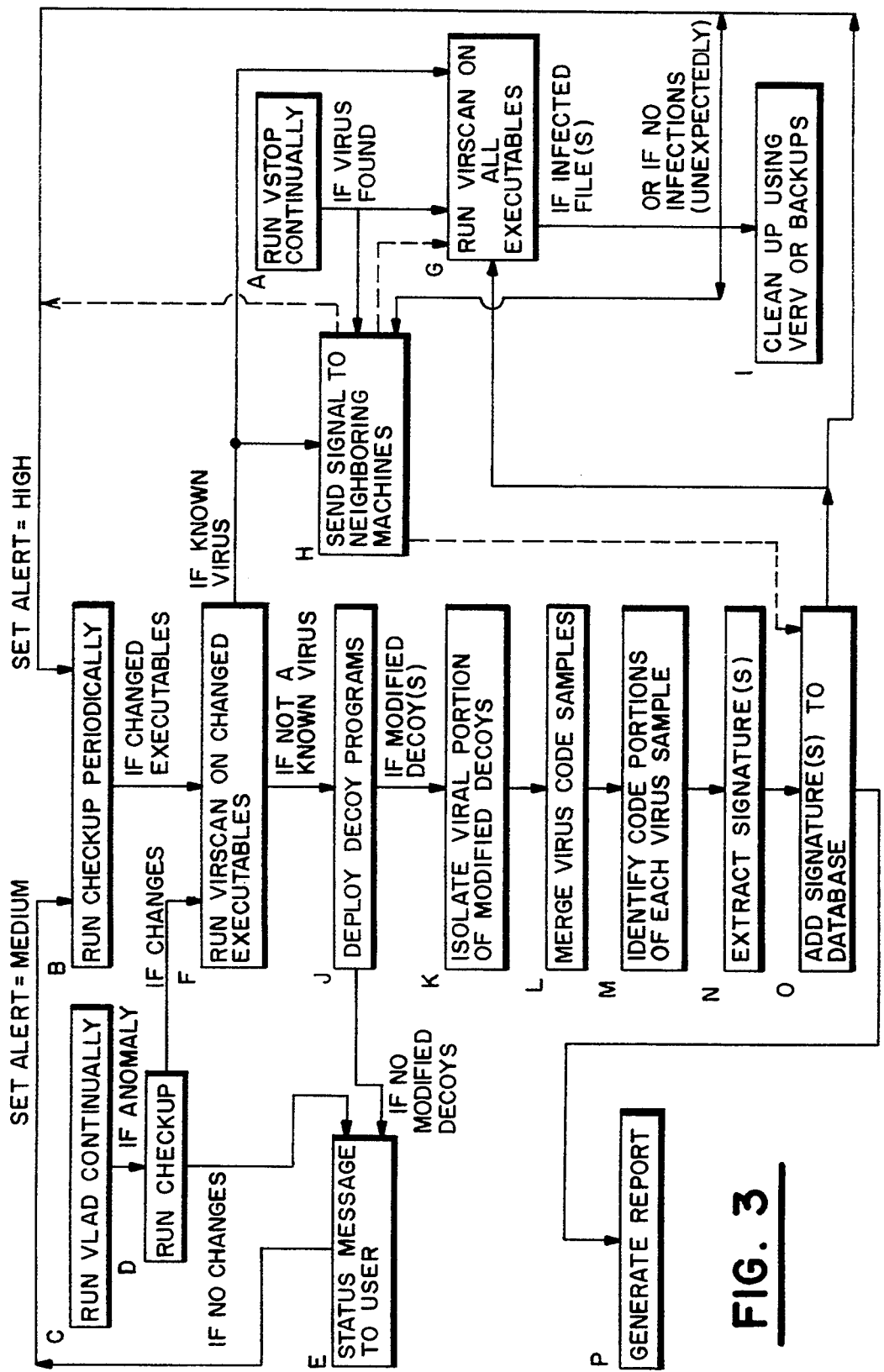
FIG. 3 is a more detailed flow chart depicting the operation of the method of the invention.

Having described in detail the operation of the method of the invention, reference is now made to FIG. 3 for showing in greater detail a preferred embodiment of the method of the invention for combatting viruses within a computer network. The method is suitable for use under DOS, but a presently preferred technique employs a multi-tasking operating system such as OS/2.

The ensuing description refers to programs (VSTOP, CHECKUP, and VIRSCAN) that were available as separate components from the International Business Machines Corporation, and that have now been integrated into an AntiVirus program. In other embodiments of the invention other software modules having similar functionality may be employed.

Block A: Run VSTOP continually

VSTOP runs as a TSR (Terminate and Stay Resident) process under DOS (or a DOS session under OS/2). When a program makes a system service request, VSTOP obtains control, and checks the calling program for signatures of known viruses. If a virus is detected the user is informed as to which virus is present. The user is also enabled to run the program (bypassing the imbedded virus).

When employed with the automatic immune system of this invention, if VSTOP detects a virus it also initiates Block G, which runs VIRSCAN on all executables. If the machine is connected to other machines (e.g. on a LAN), a kill signal is sent to a chosen subset of the other machines (Block H).

Block B: Run CHECKUP periodically

When CHECKUP is initially installed it calculates a checksum of each executable file in the system, based upon some keyword supplied by the user. Later, at the instigation of the user or another computational process, CHECKUP uses the same keyword to recalculate the checksum of specified (one or more or even all) executable files. A change in the checksum of a file indicates that it has been modified.

When used in the automatic immune system of this invention, CHECKUP is run on all executables at intervals determined both by the user and/or by feedback from other components of the immune system. If some other components indicate that there is an increased risk of present or imminent viral infection the level of alertness is adjusted upwards, and the interval between successive executions of CHECKUP is decreased. This will occur in response to, by example, a virus-like activity detector (VLAD, described below) observing virus-like behavior (Block C), CHECKUP detecting a modification (Blocks B or D), VIRSCAN identifying an infected file or files, or a kill signal being received from an infected neighboring computer on the network (Block H on the neighboring machine). As time passes, the level of alertness is decreased towards some baseline level, unless a new alert signal is received from some other component of the immune system. The receipt of a new alert signal may either preempt the current alert state or instead cause the current level of the alert state to be adjusted upwards.

If at any point CHECKUP detected a change in one or more executables, VIRSCAN is invoked and run on all changed executables (Block F).

Block C: Run VLAD continually

There are patterns of system activity that are commonly observed when a virus infects a program, but which are rarely observed, if at all, when a legitimate (non-infected) program is being executed. The VLAD monitors system activity to detect a pattern of activity that is indicative of the presence of a virus, and generates an alert signal when virus-like behavior is detected.

Under DOS, VLAD can be run as a TSR (Terminate and Stay Resident) process; while under OS/2 VLAD can be run continuously, monitoring all system activity.

If VLAD detects virus-like anomalous behavior, it invokes CHECKUP (Block D).

Block D: Run CHECKUP

When initiated by VLAD (Block C), CHECKUP determines whether any executables have been recently modified. If so, VIRSCAN is run on all changed executables (Block F). If there are no changed executables, the user is informed that there was an anomaly detected by VLAD, but no executables were modified (Block E).

Block E: Status message to user

If initiated by Block D, the user is informed that there was an anomaly detected by VLAD, but no executables were modified. If initiated by Block J, the user is informed that, although CHECKUP detected one or more changed executables, the decoy programs failed to capture a virus. In either case, a moderate-level alert is issued to Block B, thereby increasing the frequency at which CHECKUP is executed.

Block F: Run VIRSCAN on changed executables

VIRSCAN employs a database of signatures consisting of byte sequences which are known to be contained in known viruses. If any of these byte sequences are found in an executable file, the probability is high that the file is infected with the corresponding virus.

If CHECKUP (Blocks B or D) indicates that some executables have been modified, VIRSCAN is run on all of the changed executables to determine whether the change can be attributed to a known virus, i.e., one contained in the VIRSCAN signature database.

If VIRSCAN finds that one or more of the modified executables are infected with a known virus, it then checks all executables on the system for infection (Block G). If the computer is connected to other computers (e.g., via a LAN), a kill signal is sent to some subset (possibly all) of the other computers (Block H).

If VIRSCAN fails to identify any of the changes to the executables as a known virus, the user is informed of the situation. In a partially manual mode of operation, and at the user's request, the immune system attempts to capture a copy of any unknown virus that might be in the system by using decoy programs (Blocks J). In a fully automatic mode of operation Block J is immediately invoked by the immune system software.

Block G: Run VIRSCAN on all executables

There are several conditions under which VIRSCAN is run on all executables in the system. These include the following five cases.

1. During the installation of the immune system on a new machine.
2. When VSTOP (Block A) detects a virus signature in a program that is just about to be executed.
3. When a previous run of VIRSCAN on modified executables (Block F) discovers one or more infections.
4. When a new, previously-unknown virus has been analyzed by other components of the immune system, resulting in the addition of a new signature to the VIRSCAN signature database (Block O).
5. When a kill signal from a neighboring machine on the network indicates that a virus has been detected (Block H on the neighboring machine).

For case (1), the full VIRSCAN signature database is used on all executables. For cases (2)-(5) either the full VIRSCAN signature database can be employed or, for greater speed, a subset of the signature database that contains only those signatures corresponding to viruses which have been identified by Blocks A, F, O, or H.

If, in running VIRSCAN on all executables, additional viral strains are discovered which were not identified by Blocks A, F, or O (if any of these Blocks initiated the operation of Step G), a kill signal is sent to neighboring machines to inform them of the infection (Block H).

If there are any infected files, cleanup is initiated (Block I). If no infections are found, the user may be provided a message so indicating.

If Block G is initiated by VSTOP (Block A), at least one virus is assumed to be active in the system. A warning message is generated if VIRSCAN fails to find the virus, and a high alert state is entered. If Block G is initiated by Block F, there will be at least one infected file, specifically a modified executable that was found to be infected by Block F. If Block G was initiated by Block O, a copy of the virus can be expected to have been found in some executable other than the decoy program that captured it. However, polymorphic viruses (which can completely change their form from one instance to another) may result in a failure by VIRSCAN to find another instance of the derived signature. In this case, the user receives a warning message to this effect, and the high alert state is entered. If Block G is initiated by Block H, i.e., the receipt of a kill signal from another computer on the network, then a possibility exists that no files are infected, and thus in this case no alert is issued.

Block H: Send kill signal to neighboring machines

If VIRSCAN (Block G) identifies one or more infected files, and if the computer that executed VIRSCAN is connected to other computers (e.g. via a LAN), the kill signal is sent to some subset (possibly all) of the other computers (Block H). As described above, the kill signal is sent to neighboring computers and includes information about the viruses responsible for the infection (which is delivered to Block G on neighboring machines), along with associated identifying signatures (which is delivered to Block O of the neighboring machines).

Block I: Clean up using VERV or backups

If VIRSCAN (Block G) has identified one or more infected files, an attempt is made to restore each infected file to an uninfected condition. VERV is capable of removing many of the most common viruses from infected files by determining whether the virus is an exact copy of one that it is capable of removing. If so, VERV removes the virus. If the virus cannot be removed by VERV, an automatic restore from a tape backup or from a read-only directory on a server, or from another machine on the network is attempted. If an automatic restoration of the infected file cannot be accomplished, the user receives a message describing the situation, with instructions for manually restoring the file from backup.

VERV can also be employed for the purposes of this invention to remove minor variants of known viruses by treating them as if they were exactly the same as the known version. The resulting disinfected file is then checked by running CHECKUP (Block B) and determining whether the checksum of the file matches the value it had prior to infection. If not, automatic or manual restoration of the original file can be attempted.

Block J: Deploy decoy programs

If CHECKUP (Blocks B or D) has detected one or more modified executables, but VIRSCAN (Block F) is unable to attribute the modification to a known virus, the modification may be due to an unknown virus. A variety of decoy programs are then run in an attempt to capture copies of the virus. After each run, CHECKUP (Block B) is employed to check for modified executables. If a decoy program has been modified, then there exists a high probability that an unknown virus is contained within the system. Comparison of the modified decoy program with the securely-stored original yields a copy of the virus program (Block K). If some other program has been modified, there is strong evidence for an unknown virus. In such a case, in order to increase the chances of capturing the virus, the newly-modified program is temporarily re-named, a decoy program with the same name is created and placed in the same directory, and the originally-modified executable is run again in an attempt to infect the decoy program.

If there is an unknown virus in the system, it is impossible to know in advance whether the virus goes resident, and what criteria it may employ to choose programs to infect. As was described above, the decoy programs are preferably placed in a variety of likely places and run, copied, opened, and created frequently (interspersed with running the originally-modified executable). Another method to further enhance the chances of infecting the decoy program is to start a resident process which temporarily presents an artificial environment to a virus, and in which the file system appears to contain only those programs which are decoy programs.

If a predetermined amount of time has elapsed and no virus samples have been captured by decoy programs, the user can receive a message (Block E) to the effect that an executable was modified, but that no further evidence of a virus was discovered. If no virus samples have been captured, but other executables were modified during the course of executing Block J, the user receives a message indicating that there is strong evidence of a virus, but that the immune system has as yet been unable to capture a sample. A high alert state is entered, and the Distress Signal generated at Block G (FIG. 3) can instruct the user to contact an expert. If desired, the user could instruct the immune system to continue the attempt to capture a sample of the virus.

If a decoy program(s) captures a virus sample, the immune system may remain in Block J in an attempt to capture additional samples of the virus. After a predetermined period of time, or after a predetermined number of virus samples have been captured, control passes to Block K.

Figure 1B:
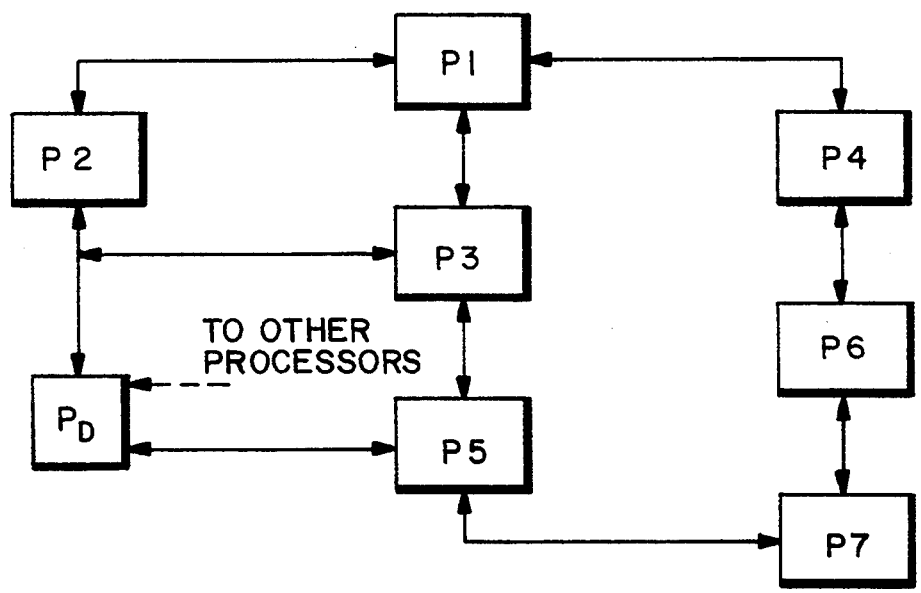
Figure 1C:
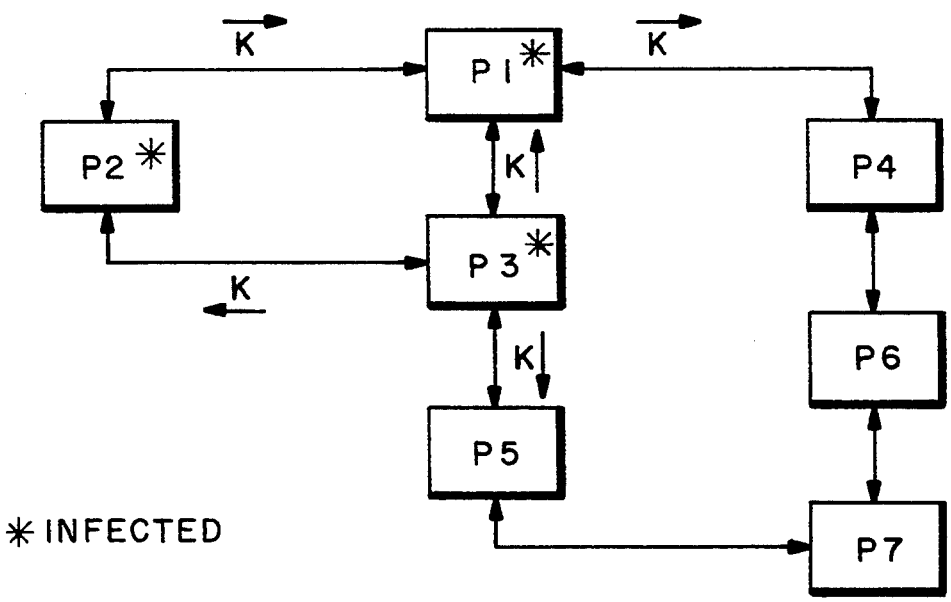
FIG. 1c illustrates the exemplary computer network of FIG. 1b and the use of a kill signal that is transmitted by infected computers to neighboring computers.

If the computer on which the immune system is installed is part of a network (e.g. a LAN), the decoy programs may be deployed on another machine, preferably the dedicated processor $P_D$ of FIG. 1b. In this case, any modified executables are sent over the network from the infected computer to the decoy server $P_D$, which performs the functions described above. It is thus assumed that the decoy server $P_D$ is reachable from and by all processors connected to the network. The decoy server $P_D$ sends the results back to the infected computer over the network. By running the decoy programs on the physically distinct decoy server $P_D$ the risk of creating further copies of the virus on the infected machine is reduced.

The decoy server could return control to the infected machine at a number of points (after Blocks K, L, M, or N), but preferably the decoy processor performs Blocks J, K, L, M, and N so as to reduce the risk of further contamination of the infected machine.

Block K: Isolate viral portion of modified decoys

If one or more virus samples are captured by the decoy programs (Block J) each modified decoy program is compared with a securely-stored original to yield a sample of the virus (or viruses). Control is then passed to Block L.

Block L: Merge virus samples

If there is more than one virus sample identified at Block K, there is a high probability that they were generated by the same virus. A technique, similar to that used in the UNIX operating system's diff command, may be used to establish which parts of each possible pair of samples are similar. If the similarity between a given pair is sufficiently large, the two are merged into a single virus code sample, with areas of dissimilarity marked. For example, areas in which the number of bytes is the same, but the bytes are different between the two samples, are marked with question marks; dissimilar areas with different lengths are replaced with the notation #n#, where n is the length of the shorter area.

Merging continues until it no longer possible. If there remains more than one virus code sample, there are either several different viruses or, more likely, the virus is polymorphic. This situation is noted in the report at Block P.

Having obtained one or more samples, the results are passed to Block M for code/data segregation.

Block M: Identify code portions of virus sample(s)

In order to determine which sections of each virus sample are machine code, each virus sample is executed on a simulator of the operating system calls. This simulator can be executed by the infected computer, or can be executed by the dedicated processor $P_D$. The executed viral code portions (possibly including portions that would be executed if all conditionals were satisfied) are left as is, and the data portions are specially marked. By example, sections identified as data are replaced with special symbols such as periods or question marks. Control is then passed to Block N.

If for any reason the invariant portions of the virus sample cannot be identified, a failure message is added to the report (Block P).

Block N: Extract virus signatures

The automatic procedure for extracting signatures from the virus code samples has been described in detail above. Having obtained one or more signatures for each virus code sample, the immune system outputs them to the VIRSCAN virus signature database (Block O).

Block O: Add signature to VIRSCAN database

The signature(s) extracted at Block N are added to the VIRSCAN virus signature database. VIRSCAN is then run on all executables (Block G), and the kill message containing the new virus signatures is sent to any neighboring processors (Block H).

Another pathway by which signatures are added to the VIRSCAN database is by receiving a kill signal from a neighboring infected processor, wherein the kill signal contains virus signature information (Block H). If the signature in the received kill message is not already in the VIRSCAN database, the signature is added at Block O.

Block P: Generate report

Results of each stage of the progress from initial capture of an unknown virus to the extraction of a signature for the captured virus (Blocks J through N) are recorded in a report. If the user is on a network, the report is sent to a network server, and a message is sent to alert the network administrator to the generated report. The administrator preferably forwards the report to a virus expert so that the newly identified virus can be analyzed further and the signature distributed with a next release of the immune system software.

In particular, the report includes encrypted versions of the decoy programs, in both their original and virus-modified forms, the merged virus code samples, and the extracted signature. If difficulties are encountered at any stage, for example, code portions of the signature could not be identified, or more than one merged virus code sample exists (indicating possible polymorphism), these conditions are also noted in the report.

Figure 8:
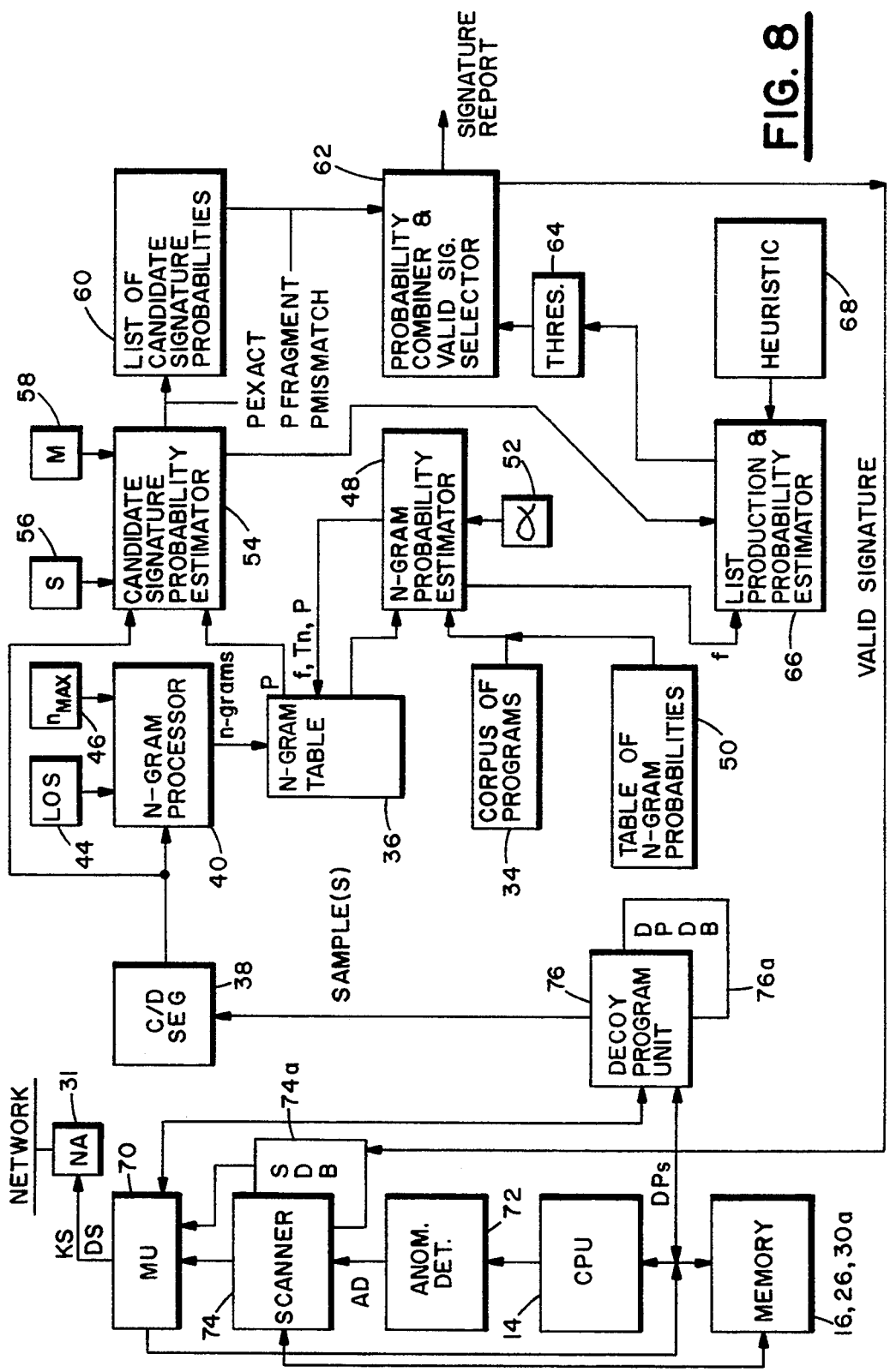
FIG. 8 is a block diagram of a system operable for executing the method of the invention.

Having described the method of the invention in the context of the data processing system 10 of FIG. 1a, reference is now made to the block diagram of FIG. 8. A description is first provided of the signature extraction components.

The IF 32, corpus 34, and n-gram_table 36 function as in FIG. 1a and are numbered accordingly. An n-gram processor 40 has an input that is connected to a code/-data segregator block 38 and receives sections of virus code therefrom. The n-gram processor 40 operates in accordance with the procedure Build_Ngram_List. The block LOS 44 provides the length_of_section information. The block $n_{Max}$ 46 provides a value that is typically in the range of 3–8. The n-gram processor 40 is coupled to the n-gram_table 36 for storing the unique n-grams therein.

Coupled to an output of the n-gram_table 36 is an n-gram probability estimator 48. The estimator 48 operates in accordance with Equations 1 and 2 for either Method 1 or Method 2. When operating in Method 1 the estimator 48 receives n-grams from the table 36 and also byte strings from the corpus of programs 34. When operating in Method 2, the estimator 48 is coupled instead to a table of n-gram probabilities 50. Estimator 48 receives a value for alpha from the block 52 and provides to the n-gram_table 36 the values for f, $T_n$, and p, as described above.

The system also includes a candidate signature probability estimator 54 that operates in accordance with the procedures and equations:

X_Probability_Extraction_Mode,
Exact-Match_Probability(signature),
Calculate_Sequence_Probability(byte-sequence;P),
Calculate_Block_Probability(byte-block)-(Equation 3),
Fragment_Probability(signature),
Equation 4, and
Mismatch_Probability(signature;M).

The estimator 54 receives inputs from blocks 56 and 58, the inputs being expressive of the signature length (S) and the number of allowed mismatches (M), respectively. The list Q and other required storage elements are internally maintained by the estimator 54. An output of estimator 54 is coupled to a memory providing storage for a list of candidate signature probabilities 60, and provides the values for $p_{Exact}$, $p_{Fragment}$, and $p_{Mismatch}$ thereto.

Coupled to an output of the list 60 is a probability combiner and valid signature selector 62. Block 62 operates in accordance with Blocks D and E of FIG. 5 and, if required, the flowchart of FIG. 7. Coupled to the combiner and selector block 62 is a threshold block 64. Threshold block 64 provides a current threshold value to the combiner and selector block 62. The combiner and selector 62 also receives an input from the corpus of programs 34 when operating in accordance with the flowchart of FIG. 7. The output of the combiner and selector 62 is the signature report. This output can be provided to a suitable display device and/or as a file for inputting to, for example, a virus scanner program.

Blocks 66 and 68 are employed for the case where the threshold probability is being determined. Block 66 operates in accordance with Blocks E and F of FIG. 7 and receives inputs from blocks 48, 54 and 68. Block 66 provides an output to block 64. Treating byte sequences taken from the probe set as candidate signatures, and treating the training set as the corpus, block 48 provides the information required by block 54 to calculate probability estimates. These probability estimates are input to block 66. In addition, treating the same byte sequences as candidate signatures and using the test set as the corpus, block 48 tallies the frequency of each "candidate signature" and feeds the frequencies (f) to block 66. At block 66, the probability estimates and the tallied frequencies are combined, as described previously with respect to blocks E and F of FIG. 7, to calculate the false-positive and false-rejection probabilities as a function of the threshold. Block 68 represents, in one embodiment, a heuristic for making a reasonable trade off between the need to minimize both of these quantities. In another embodiment, block 68 represents user interactive input. For this latter embodiment the user is provided a display of false-positive and false-rejection curves and inputs a choice of threshold based on this information. In either case, the threshold is stored in block 64 for use by block 62.

The blocks 40, 48, 54, 62 and 66 can be implemented as separate dedicated processing devices, or by a single processing device that operates in accordance with the method of the invention. The blocks 32, 34, 36, 50, and 60 can be implemented with separate memory devices or with a single memory device, such as a RAM or a disk. Blocks 44, 46, 52, 56, 58, and 64 may be implemented with registers or as locations within a memory device.

The system further includes a management unit 70 for controlling the operation of the system in accordance with the above-described flow charts of FIGS. 2 and 3. The system memory 16, 26, 30a is bidirectionally coupled to the CPU 14. Coupled to the CPU 14 is an anomaly detector 72 (VLAD) that monitors the operation of the CPU 14 to detect anomalous behavior thereof. The anomalous behavior may be the result of an undesirable software entity that is located within the memory. Upon detecting anomalous behavior, the anomaly detector 72 notifies the MU 70 via an anomaly detected signal (AD). In response, the MU 70 initiates the operation of a scanner 74 which has an associated signature database (SDB 74a). Scanner 74 operates to detect, if present, an occurrence of a known type of undesirable software entity. This detection is accomplished by comparing valid signatures from the SDB 74a with programs stored in the memory. The scanner 74 provides an output to the MU 70 indicating success or failure in detecting an undesirable software entity.

In response to a successful detection by the scanner 74, the MU 70 operates to remove the undesirable software entity from the memory in the manner described above. The MU 70 also transmits the kill signal (KS) via the network adapter (NA) 31 to neighboring data processors that are connected to the network.

In response to a failure of the anomaly detector 72 to detect a known type of undesirable software entity, the MU 70 initiates the operation of a decoy program unit 76. The decoy program unit 76 has an associated secure decoy program database (DPDB) 76a. The decoy program unit 76 operates in the manner described above to execute, open, etc. one or more decoy programs (DPs) within the memory. The DPs are periodically compared to the secured copies stored within the DPDB 76a so as to detect a modification thereof. If a modification is detected, the DPU 76 isolates the undesirable software entity and provides one or more samples of the isolated undesirable software entity to the code/data segregator 38. The invariant code identifier 38 operates to identify invariant code portions of the sample(s) and to provide the invariant code portions to the n-gram processor 40 as candidate signatures.

After processing the candidate signatures in the manner described above, a valid signature for the previously unknown type of undesirable software entity is stored within the SDB 74a for subsequent use by the scanner 74.

If difficulties arise, the MU 70 is also enabled to transmit the distress signal (DS) to, for example, the network adapter 31 and thence to the network.

A feature of this invention is the taking of remedial action in the event that a known or unknown signature of an undesirable software entity is identified or extracted. Remedial action includes killing or removing the undesirable software entity, and also possibly informing neighboring data processors of the existence and signature of the entity. Possible methods for removing the undesirable software entity include, but are are not limited to, (a) replacing an infected file with a stored, secured, uninfected version of the file; (b) repair mechanisms designed for specific known types of undesirable software entities; and (c) heuristic repair mechanisms which are designed for classes of undesirable software entities.

This invention has been particularly shown and described with respect to preferred embodiments thereof. However, it will be understood by those skilled in the art that changes in form and details may be made therein without departing from the scope and spirit of the invention.

Having thus described our invention, what we claim as new, and desire to secure by Letters Patent is:

1. A method for providing computational integrity for a digital data processing system, comprising the computer-executed steps of:
   detecting, with a data processor, an anomalous behavior of a digital data processing system during program execution, the anomalous behavior being indicative of an undesirable informational state of the digital data processing system that may result from the presence of an undesirable software entity;
   scanning, with the data processor, one or more portions of an informational state history of the digital data processing system to detect, if present, at least one known type of undesirable software entity;
   in response to the detection of a known type of undesirable software entity, taking remedial action;
   else, if a known type of undesirable software entity is not detected by the step of scanning, detecting, with the data processor, a previously unknown type of undesirable software entity;
   extracting, with the data processor, an identifying signature from the detected undesirable software entity;
   storing the identifying signature so as to enable a future detection of the undesirable software entity as a known type of undesirable software entity; and taking remedial action; wherein
   the step of extracting includes the data processor executed steps of obtaining at least one sequence of bytes from the detected undesirable software entity, determining likelihoods that the at least one sequence of bytes is also found in program code that may be run on a digital data processing system which is to be protected from the undesirable software entity, and selecting as the extracted identifying signature a plurality of bytes from the at least one sequence that have a high likelihood of reliably identifying a future occurrence of the undesirable software entity.

2. A method for providing computational integrity for a digital data processing system, comprising the computer-executed steps of:
   detecting, with a data processor, an anomalous behavior of a digital data processing system during program execution, the anomalous behavior being indicative of an undesirable informational state of the digital data processing system that may result from the presence of an undesirable software entity;
   scanning, with the data processor, one or more portions of an informational state history of the digital data processing system to detect, if present, at least one known type of undesirable software entity;
   in response to the detection of a known type of undesirable software entity, taking remedial action;
   else, if a known type of undesirable software entity is not detected by the step of scanning, detecting, with the data processor, a previously unknown type of undesirable software entity;
   extracting, with the data processor, an identifying signature from the detected undesirable software entity;
   storing the identifying signature so as to enable a future detection of the undesirable software entity as a known type of undesirable software entity; and taking remedial action;
wherein the step of extracting includes a preliminary step of analyzing the undesirable software entity to identify a portion thereof that remains substantially invariant from a first instance of the undesirable software entity to a second instance of the undesirable software entity, wherein the step of extracting extracts the identifying signature from the identified substantially invariant portion; and wherein
   the step of extracting includes the steps of obtaining a sequence of bytes from the identified substantially invariant portion of the undesirable software entity, decomposing the sequence of bytes into subsequences, determining likelihoods that the subsequences are also found in program code that may be run on a digital data processing system which is to be protected from the undesirable software entity, and selecting as the extracted identifying signature a plurality of bytes that have a high likelihood of reliably identifying a future occurrence of the undesirable software entity.

3. A method as set forth in claim 1 wherein the step of storing stores the identifying signature into a data base of identifying signatures for use during the step of scanning.

4. A method as set forth in claim 1 and, in response to the detection of a known type of undesirable software entity, further including a step of operating a data communications means of the digital data processing system for notifying at least one other digital data processing system of the presence of the undesirable software entity.

5. A method as set forth in claim 1 and, in response to detecting a previously unknown type of undesirable software entity, further including a step of operating a data communications means of the digital data processing system for notifying at least one other digital data processing system of the presence of the undesirable software entity.

6. A method as set forth in claim 5 and further including a step of operating the data communications means of the digital data processing system for providing the at least one other digital data processing system with the identifying signature of the undesirable software entity.

7. A method as set forth in claim 1 wherein the undesirable software entity is a computer virus, wherein the step of detecting includes a step of obtaining at least one instance of a computer virus; and wherein the step of extracting extracts the identifying signature from the obtained at least one instance of the computer virus.

8. A method as set forth in claim 1 wherein the undesirable software entity is a computer virus, and wherein the step of detecting includes the steps of:
   operating at least one decoy program with the digital data processing system; and
   comparing the decoy program to a secure copy of the decoy program so as to identify a modification of the decoy program, wherein a modification of the decoy program is indicative of an infection of the decoy program by the computer virus.

9. A method for providing computational integrity for a digital data processing system, comprising the computer-executed steps of:
   detecting, with a data processor, an anomalous behavior of a digital data processing system during program execution, the anomalous behavior being indicative of an undesirable informational state of the digital data processing system that may result from the presence of an undesirable software entity;
   scanning, with the data processor, one or more portions of an informational state history of the digital data processing system to detect, if present, at least one known type of undesirable software entity;
   in response to the detection of a known type of undesirable software entity, taking remedial action;
   else, if a known type of undesirable software entity is not detected by the step of scanning, detecting, with the data processor, a previously unknown type of undesirable software entity;
   extracting, with the data processor, an identifying signature from the detected undesirable software entity;
   storing the identifying signature so as to enable a future detection of the undesirable software entity as a known type of undesirable software entity; and taking remedial action;
   wherein the step of extracting includes the steps of:
   obtaining at least one candidate signature of the undesirable software entity from at least one sample of the undesirable software entity, the at least one sample including a sequence of bytes of the undesirable software entity that is likely to remain invariant from a first instance of the undesirable software entity to a second instance of the undesirable software entity;
   constructing a list of unique n-grams from the sequence of bytes, each of the unique n-grams being comprised of from one to some maximal number of sequential bytes contained in the sequence of bytes;
   for each of the unique n-grams, estimating a probability of an occurrence of a unique n-gram within sequences of bytes obtained from a corpus of computer programs of a type that may be executed by the digital data processing system;
   for each candidate signature that is comprised of one or more of the unique n-grams, wherein each candidate signature includes all possible sequences of the unique n-grams in the at least one sample which satisfy a predetermined criterion, estimating a probability of an occurrence of the candidate signature within the sequences of bytes obtained from the corpus of computer programs; and
   accepting a candidate signature as a valid signature at least if the estimated probability of the occurrence of the candidate signature is less than a threshold probability, the threshold probability having a value selected to reduce a likelihood of an occurrence of a false positive indication during a subsequent execution of the step of scanning.

10. A method as set forth in claim 9 wherein the step of obtaining includes the initial steps of:
    obtaining one or more instances of the undesirable software entity; and
    evaluating the one or more instances to identify at least one portion that includes a sequence of bytes that represent machine code instructions of the undesirable software entity that appear in each of the one or more instances.

11. A method as set forth in claim 9 wherein the step of estimating a probability of an occurrence of a unique n-gram includes a step of recording a frequency of occurrence of the n-gram within the sequences of bytes obtained from the corpus of computer programs.

12. A method as set forth in claim 11 wherein for uni-grams (n=1), the estimated probability is given by the recorded frequency divided by a total number of n-grams of length equal to one; and for n-grams (n≧2) the estimated probability is given by a weighted average of the recorded frequency and a probability determined by combining together shorter n-grams.

13. A method as set forth in claim 12 wherein two (n−1)-gram probabilities and an (n−2)-gram probability are combined to form an n-gram probability (p) in accordance with the expression:

$$p(B_1 B_2 \ldots B_n) = \frac{p(B_1 B_2 \ldots B_{n-1}) p(B_2 B_3 \ldots B_n)}{p(B_2 B_3 \ldots B_{n-1})},$$

where $B_1$ to $B_n$ are sequentially occurring bytes.

14. A method as set forth in claim 9 wherein the step of estimating a probability of an occurrence of a unique n-gram includes a step of looking up the n-gram, or some smaller constituent of the n-gram, within a predetermined table of probabilities that represents occurrences of n-grams within the sequences of bytes obtained from the corpus of computer programs.

15. A method as set forth in claim 9 wherein the step of estimating a probability of an occurrence of the candidate signature includes the step of estimating a probability of an exact match between the candidate signature and the sequences of bytes obtained from the corpus of computer programs.

16. A method as set forth in claim 15 wherein the step of estimating a probability of an exact match includes an initial step of replacing any bytes that may potentially vary, from a first instance of the undesirable software entity to a second instance, with a wildcard symbol that has an exact match with every byte in the sequences of bytes obtained from the corpus of computer programs.

17. A method as set forth in claim 16 wherein the step of estimating a probability of an exact match includes a second initial step of segregating the candidate signature into one or more contiguous blocks of bytes each of which contains no wildcard bytes, and wherein the exact match probability is found by multiplying together probabilities of each of the segregated one or more contiguous blocks of bytes.

18. A method as set forth in claim 9 wherein the step of estimating a probability of an occurrence of the candidate signature includes the step of estimating a probability of a partial match between the candidate signature and the sequences of bytes obtained from the corpus of computer programs.

19. A method as set forth in claim 18 wherein the step of estimating a probability of a partial match includes an initial step of replacing any bytes that may potentially vary, from a first instance of the undesirable software entity to a second instance, with a wildcard symbol that has an exact match with every byte in the sequences of bytes obtained from the corpus of computer programs.

20. A method as set forth in claim 18 wherein the step of estimating a probability of an occurrence of the partial match includes the step of estimating a probability of a fragment of the candidate signature matching the sequences of bytes obtained from the corpus of computer programs.

21. A method as set forth in claim 18 wherein the step of estimating a probability of an occurrence of the partial match includes the step of estimating a probability of all but M bytes of a sequence of bytes obtained from the corpus of computer programs not matching a byte in a corresponding position of the candidate signature.

22. A method as set forth in claim 1 wherein the steps of taking remedial action each include a step of removing the undesirable software entity.

23. A method as set forth in claim 1 wherein the step of taking remedial action after the step of storing includes a step of scanning one or more portions of the informational state history of the digital data processing system to detect, if present, at least one further instance of the undesirable software entity; and, in response to detecting at least one further instance of the undesirable software entity, the method includes a step of taking further remedial action.

24. A method as set forth in claim 9 wherein the step of accepting a candidate signature as a valid signature further employs a criterion that an estimated false-positive probability of the candidate signature has a value that is among the lowest of estimated false-positive probability values of all candidate signatures.

25. A method as set forth in claim 9 wherein the step of estimating a probability of an occurrence of the candidate signature includes the steps of:

estimating a first probability of an exact match between the candidate signature and the sequences of bytes obtained from the corpus of computer programs;

estimating a second probability of a fragment of the candidate signature matching the sequences of bytes obtained from the corpus of computer programs; and estimating a third probability of at most M bytes of a sequence of bytes obtained from the corpus of computer programs not matching a byte in the candidate signature.

26. A method as set forth in claim 25 and further comprising the steps of:

combining the first, second, and third probability estimates to arrive at a final probability estimate; and comparing the final probability estimate to the threshold probability.

27. A method as set forth in claim 26 and further comprising a step of reporting an identity of the valid signature.

28. A method as set forth in claim 1 wherein the step of detecting includes a step of deploying at least one decoy program to obtain a sample of the undesirable software entity.

29. A method for providing computational integrity for a network of digital data processing systems, comprising the computer-executed steps of:

detecting, with a data processor, an anomalous behavior of a digital data processing system during program execution, the anomalous behavior being indicative of the presence of an undesirable software entity within the digital data processing system that exhibits the anomalous behavior;

scanning, with the data processor, one or more portions of an informational state history of the digital data processing system to detect, if present, at least one known type of undesirable software entity;

in response to the detection of a known type of undesirable software entity, taking remedial action; and operating the data processor for notifying at least one other digital data processing system on the network of the presence of the known type of undesirable software entity;

else, if a known type of undesirable software entity is not detected by the step of scanning, locating, with the data processor, a previously unknown type of undesirable software entity;

extracting, with the data processor, an identifying signature from the located previously unknown type of undesirable software entity;

storing the identifying signature so as to enable a future detection of the previously unknown type of undesirable software entity as a known type of undesirable software entity;

using the extracted identifying signature and the data processor to scan one or more portions of an informational state of the data processing system to detect other instances of the previously unknown type of undesirable software entity;

if another instance of the previously unknown type of undesirable software entity is detected using the extracted identifying signature, taking remedial action; and operating the data processor for notifying at least one other digital data processing system on the network of the presence of the previously unknown type of undesirable software entity.

30. A method as set forth in claim 29 wherein at least the second step of notifying includes a step of providing the at least one other digital data processing system on the network with the identifying signature of the previously unknown type of undesirable software entity.

31. A method as set forth in claim 29 and including a further step of generating a distress signal if the digital data processing system if the step of locating fails to locate a previously unknown type of undesirable software entity.

32. A method for providing computational integrity for a network of digital data processing systems, comprising the computer-executed steps of:
  detecting, with a data processor, an anomalous behavior of a digital data processing system during program execution, the anomalous behavior being indicative of the presence of an undesirable software entity within the digital data processing system that exhibits the anomalous behavior;
  scanning, with the data processor, one or more portions of an informational state history of the digital data processing system to detect, if present, at least one known type of undesirable software entity;
  in response to the detection of a known type of undesirable software entity, taking remedial action; and
  operating the data processor for notifying at least one other digital data processing system on the network of the presence of the known type of undesirable software entity;
  else, if a known type of undesirable software entity is not detected by the step of scanning, locating, with the data processor, a previously unknown type of undesirable software entity;
  extracting, with the data processor, an identifying signature from the located previously unknown type of undesirable software entity;
  storing the identifying signature so as to enable a future detection of the previously unknown type of undesirable software entity as a known type of undesirable software entity;
  using the extracted identifying signature and the data processor to scan one or more portions of an informational state of the data processing system to detect other instances of the previously unknown type of undesirable software entity;
  if another instance of the previously unknown type of undesirable software entity is detected using the extracted identifying signature, taking remedial action; and
  operating the data processor for notifying at least one other digital data processing system on the network of the presence of the previously unknown type of undesirable software entity;
wherein the step of extracting includes a preliminary step of analyzing the previously unknown type of undesirable software entity to identify a substantially invariant portion thereof, and wherein the step of extracting extracts the identifying signature from the substantially invariant portion.

33. A method as set forth in claim 29 wherein the step of storing stores the identifying signature into a data base of identifying signatures for use during the step of scanning.

34. A method as set forth in claim 29 wherein the undesirable software entity is a previously unknown type of computer virus, and wherein the step of locating includes a step of generating, with a digital data processing system, one or more instances of the unknown type of computer virus to increase a size of a sample population of the unknown type of computer virus; and wherein the step of extracting extracts the identifying signature from the one or more instances of the unknown type of computer virus.

35. A method as set forth in claim 29 wherein the undesirable software entity is a computer virus, and wherein the step of detecting includes the steps of:
  deploying at least one decoy program with the digital data processing system; and
  comparing the at least one decoy program to a secure copy of the decoy program so as to identify a modification of the decoy program during the step of deploying, wherein a modification of the decoy program is indicative of an infection of the decoy program by the computer virus.

36. A method for providing computational integrity for a network of digital data processing systems, comprising the computer-executed steps of:
  detecting, with a data processor, an anomalous behavior of a digital data processing system during program execution, the anomalous behavior being indicative of the presence of an undesirable software entity within the digital data processing system that exhibits the anomalous behavior;
  scanning, with the data processor, one or more portions of an informational state history of the digital data processing system to detect, if present, at least one known type of undesirable software entity;
  in response to the detection of a known type of undesirable software entity, taking remedial action; and
  operating the data processor for notifying at least one other digital data processing system on the network of the presence of the known type of undesirable software entity;
  else, if a known type of undesirable software entity is not detected by the step of scanning, locating, with the data processor, a previously unknown type of undesirable software entity;
  extracting, with the data processor, an identifying signature from the located previously unknown type of undesirable software entity;
  storing the identifying signature so as to enable a future detection of the previously unknown type of undesirable software entity as a known type of undesirable software entity;
  using the extracted identifying signature and the data processor to scan one or more portions of an informational state of the data processing system to detect other instances of the previously unknown type of undesirable software entity;
  if another instance of the previously unknown type of undesirable software entity is detected using the extracted identifying signature, taking remedial action; and
  operating the data processor for notifying at least one other digital data processing system on the network of the presence of the previously unknown type of undesirable software entity;
wherein the undesirable software entity is a previously unknown type of computer virus, and wherein the step of extracting includes the steps of:
  obtaining at least one sample of the previously unknown type of computer virus, the at least one sample including a sequence of bytes of the computer virus that remains substantially invariant from a first instance of the computer virus to a second instance;

constructing a list of unique n-grams from the sequence of bytes, each of the unique n-grams being comprised of from one to n sequential bytes of the sequence of bytes;

for each of the unique n-grams, estimating a probability of an occurrence of a unique n-gram within sequences of bytes obtained from a corpus of computer programs of a type that may be executed by the digital data processing system;

for a candidate computer virus signature that is comprised of one or more of the unique n-grams, estimating a probability of an occurrence of the candidate computer virus signature within the sequences of bytes obtained from the corpus of computer programs; and accepting the candidate computer virus signature as a valid computer virus signature at least if the estimated probability of the occurrence of the candidate computer virus signature is less than a threshold probability, the threshold probability having a value selected to reduce a likelihood of an occurrence of a false positive indication during a subsequent execution of the step of scanning.

37. A system providing computational integrity for a digital data processing system, comprising:

means for detecting an anomalous behavior of a digital data processing system during program execution, the anomalous behavior being indicative of the presence of an undesirable software entity that may be detrimental to the computational integrity of the digital data processing system;

means, responsive to the operation of said detecting means, for scanning one or more computer programs executed by the digital data processing system to detect, if present, at least one known type of undesirable software entity;

means, responsive to the detection of a known type of undesirable software entity, for removing a detected known type of undesirable software entity from the digital data processing system;

means, responsive to a failure to detect a known type of undesirable software entity, for locating a previously unknown type undesirable software entity that has associated itself with one or more programs that are executed by the digital data processing system;

means for extracting an identifying signature from the located previously unknown type of undesirable software entity;

means for removing the located previously unknown type of undesirable software entity from the digital data processing system; and means for storing the identifying signature so as to enable a future detection of the previously unknown type of undesirable software entity as a known type of undesirable software entity.

38. A system providing computational integrity for a digital data processing system, comprising:

means for detecting an anomalous behavior of a digital data processing system during program execution, the anomalous behavior being indicative of the presence of an undesirable software entity that may be detrimental to the computational integrity of the digital data processing system;

means, responsive to the operation of said detecting means, for scanning one or more computer programs executed by the digital data processing system to detect, if present, at least one known type of undesirable software entity;

means, responsive to the detection of a known type of undesirable software entity, for removing a detected known type of undesirable software entity from the digital data processing system;

means, responsive to a failure to detect a known type of undesirable software entity, for locating a previously unknown type undesirable software entity that has associated itself with one or more programs that are executed by the digital data processing system;

means for extracting an identifying signature from the located previously unknown type of undesirable software entity;

means for removing the located previously unknown type of undesirable software entity from the digital data processing system; and means for storing the identifying signature so as to enable a future detection of the previously unknown type of undesirable software entity as a known type of undesirable software entity;

wherein the means for extracting is coupled to means for analyzing the located previously unknown type of undesirable software entity to identify a substantially invariant portion thereof, and wherein the means for extracting extracts the identifying signature from the substantially invariant portion.

39. A system as set forth in claim 37 and further including means, responsive to the detection of a known type of undesirable software entity, and further responsive to the extraction of an identifying signature from an unknown type of undesirable software entity, for notifying at least one other digital data processing system of the presence of the known or unknown type of undesirable software entity.

40. A system as set forth in claim 37 wherein the undesirable software entity is a computer virus, and wherein the means for detecting includes:

means for deploying at least one decoy program within the digital data processing system;

means for subsequently comparing the deployed decoy program to a secure copy of the decoy program so as to identify a modification of the decoy program, wherein a modification of the decoy program is indicative of an infection of the decoy program by the computer virus; and means for obtaining a sample of the computer virus from the deployed decoy program and for providing the sample to said extracting means.

41. A method for operating a network comprised of a plurality of data processors so as to provide protection from infection by an undesirable software entity, comprising the computer-executed steps of:

in response to a detection of an anomalous operation of a first one of the data processors of the network, operating the data processor to detect, within the data processor, an unknown type of undesirable software entity;

in response to detecting an unknown type of undesirable software entity, extracting, with the data processor, an identifying signature from the unknown type of undesirable software entity;

storing, within a first memory means that is accessible from the data processor, the identifying signature for subsequent use by the data processor in recognizing a subsequent occurrence of the undesirable software entity;

transmitting the identifying signature from the data processor to at least one other data processor that is connected to the network; and storing, within a second memory means that is accessible by the at least one other data processor, the identifying signature for subsequent use by the at least one other data processor in recognizing an occurrence of the undesirable software entity.

42. A method as set forth in claim 41 wherein the unknown type of undesirable software entity is a worm.

43. A method as set forth in claim 41 wherein the unknown type of undesirable software entity is a computer virus.

44. A method for operating a network comprised of a plurality of data processors so as to provide protection from infection by an undesirable software entity, comprising the computer-executed steps of:

in response to a detection of an anomalous operation of a first one of the data processors of the network, operating the data processor to detect, within the data processor, an unknown type of undesirable software entity;

in response to detecting an unknown type of undesirable software entity, extracting, with the data processor, an identifying signature from the unknown type of undesirable software entity;

storing, within a first memory means that is accessible from the data processor, the identifying signature for subsequent use by the data processor in recognizing a subsequent occurrence of the undesirable software entity;

transmitting the identifying signature from the data processor to at least one other data processor that is connected to the network; and storing, within a second memory means that is accessible by the at least one other data processor, the identifying signature for subsequent use by the at least one other data processor in recognizing an occurrence of the undesirable software entity;

wherein the step of extracting includes the steps of:

analyzing the unknown type of undesirable software entity to identify at least one portion thereof that remains substantially invariant from a first instance of the unknown type of undesirable software entity to a second instance of the unknown type of undesirable software entity;

segregating the substantially invariant portion from other portions; and performing the step of extracting on the segregated, substantially invariant portion.

45. A method as set forth in claim 44 wherein the step of analyzing includes the initial steps of:

deploying at least one decoy program to capture a sample of the unknown type of undesirable software entity; and replicating the captured sample to provide at least one further instance of the unknown type of undesirable software entity.

46. A method as set forth in claim 41 and, further in response to the detection of anomalous operation of the first one of the data processors, performing a step of raising an alert state of the data processor so as to periodically monitor the data processor to detect, if present, a known type of undesirable software entity.

* * * * *